(12) United States Patent
Onishi

(10) Patent No.: US 11,370,167 B2
(45) Date of Patent: Jun. 28, 2022

(54) SHAPING STAGE, THREE-DIMENSIONAL SHAPING APPARATUS, AND CONTROL METHOD OF THREE-DIMENSIONAL SHAPING APPARATUS

(71) Applicant: Seiko Epson Corporation, Tokyo (JP)

(72) Inventor: Hajime Onishi, Chino (JP)

(73) Assignee: Seiko Epson Corporation

( * ) Notice: Subject to any disclaimer, the term of this patent is extended or adjusted under 35 U.S.C. 154(b) by 199 days.

(21) Appl. No.: 16/546,472

(22) Filed: Aug. 21, 2019

(65) Prior Publication Data
US 2020/0061914 A1 Feb. 27, 2020

(30) Foreign Application Priority Data
Aug. 22, 2018 (JP) .............................. JP2018-155209

(51) Int. Cl.
*B29C 64/245* (2017.01)
*B33Y 30/00* (2015.01)
(Continued)

(52) U.S. Cl.
CPC ............ *B29C 64/245* (2017.08); *B29C 64/25* (2017.08); *B29C 64/393* (2017.08); *B33Y 30/00* (2014.12); *B33Y 50/02* (2014.12)

(58) Field of Classification Search
CPC .................................................. B29C 64/245
(Continued)

(56) References Cited

U.S. PATENT DOCUMENTS

2016/0136903 A1 5/2016 Herran et al.
2016/0144428 A1* 5/2016 Mironets ............ B23K 15/0086
419/7

(Continued)

FOREIGN PATENT DOCUMENTS

JP 2016-521315 A 7/2016
JP 2017-517409 A 6/2017
(Continued)

OTHER PUBLICATIONS

Missouri S&T, Lecture Notes, https://classes.mst.edu/civeng120/lessons/thermal/thermaLexpansion/index.html, Jun. 8, 2014 (publication date from Internet Archive, accessed Aug. 10, 2021) (Year: 2014).*

(Continued)

*Primary Examiner* — Matthew J Daniels
*Assistant Examiner* — Andrew L Swanson
(74) *Attorney, Agent, or Firm* — Harness, Dickey & Pierce, P.L.C.

(57) ABSTRACT

A shaping stage has a shaping face where a shaping material is deposited and is used in a three-dimensional shaping apparatus by being subjected to temperature control. The shaping stage includes a first member having a plurality of recess portions or penetration portions and a first shaping face portion that is present in peripheries of the recess portions or the penetration portions and that is included in the shaping face, and a second member that is placed inside the recess portions or the penetration portions, that has a second shaping face portion included in the shaping face, and that has a thermal expansion coefficient different from the first member.

7 Claims, 17 Drawing Sheets

(51) Int. Cl.
  *B29C 64/393*    (2017.01)
  *B29C 64/25*     (2017.01)
  *B33Y 50/02*     (2015.01)

(58) Field of Classification Search
  USPC .......................................... 269/53, 54.4–54.5
  See application file for complete search history.

(56) References Cited

U.S. PATENT DOCUMENTS

2018/0117854 A1* 5/2018 Hart .................. B22F 12/00
2018/0200800 A1* 7/2018 Hart .................. B22F 7/08

FOREIGN PATENT DOCUMENTS

| | | |
|---|---|---|
| JP | 2017-189875 A | 10/2017 |
| JP | 2017-200727 A | 11/2017 |
| JP | 2017-222072 A | 12/2017 |
| JP | 2018-118434 A | 8/2018 |
| WO | WO-2016-077830 A1 | 5/2016 |

OTHER PUBLICATIONS

Extended European Search Report for Patent Application No. EP 19193076.7 dated Jan. 20, 2020 (12 pages).

* cited by examiner ptshell
SHAPING STAGE, THREE-DIMENSIONAL SHAPING APPARATUS, AND CONTROL METHOD OF THREE-DIMENSIONAL SHAPING APPARATUS The present application is based on, and claims priority from, JP Application Serial Number 2018-155209, filed Aug. 22, 2018, the disclosure of which is hereby incorporated by reference herein in its entirety.

BACKGROUND

1. Technical Field

The present disclosure relates to a shaping stage of a three-dimensional shaping apparatus.

2. Related Art

Heretofore, there have been proposed various three-dimensional shaping apparatuses for shaping a three-dimensional shaped article by depositing a shaping material on a shaping stage. For example, JP-A-2017-200727 (Patent Document 1) discloses a three-dimensional shaping apparatus in which a shaping stage is constituted by an upper plate having a plurality of penetration holes and a lower plate that is placed under the upper plate and that has projection portions inserted into the penetration holes of the upper plate. In the three-dimensional shaping apparatus disclosed in Patent Document 1, a three-dimensional shaped article is shaped on the upper plate in a state where the projection portions of the lower plate project from the surface of the upper plate through the penetration holes. Then, after completion of shaping of the three-dimensional shaped article, the lower plate is separated from the upper plate, and the projection portions of the lower plate are pulled out from the bottom face of the three-dimensional shaped article, thereby facilitating separation of the three-dimensional shaped article from the shaping stage.

However, in the technique disclosed in Patent document 1, the shaping stage is constituted by the upper plate and the lower plate, and moreover, it is necessary to provide a mechanical mechanism for moving the upper plate and the lower plate, and therefore, the configuration of the three-dimensional shaping apparatus may increase in size or get complicated.

SUMMARY

An object of the present application is to realize facilitation of separation of a three-dimensional shaped article after shaping from a shaping stage in a three-dimensional shaping apparatus with a simpler configuration.

An aspect of the present disclosure is directed to a shaping stage that has a shaping face where a shaping material is deposited and that is used for three-dimensional shaping by being subjected to temperature control. The shaping stage includes a first member having a plurality of recess portions or penetration portions and a first shaping face portion that is present in peripheries of the recess portions or the penetration portions and that is included in the shaping face, and a second member that is placed in internal spaces of the recess portions or the penetration portions, that has a second shaping face portion included in the shaping face, and that has a thermal expansion coefficient different from the first member.

DESCRIPTION OF EXEMPLARY EMBODIMENTS

1. First Embodiment

Figure 1:
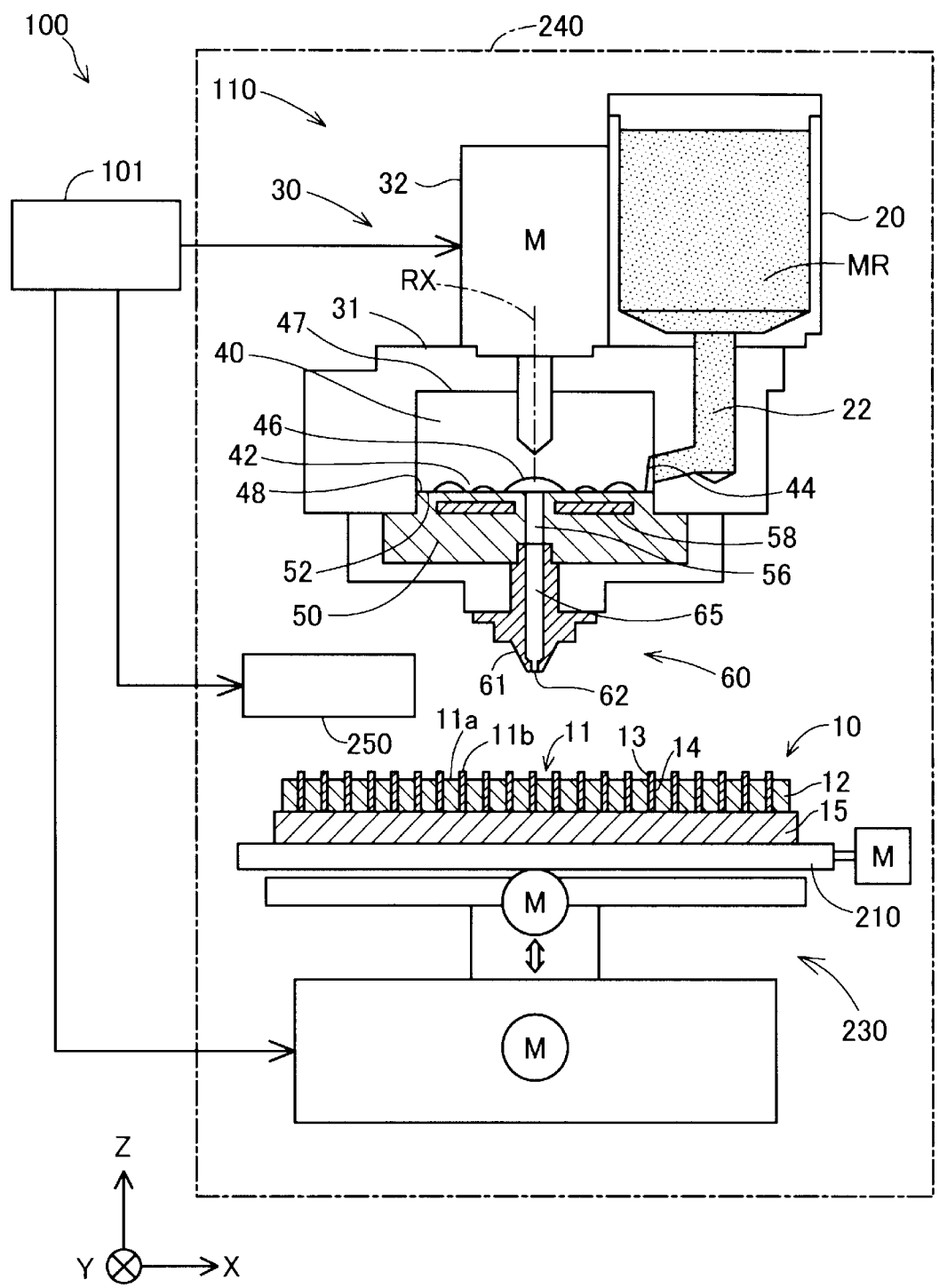
FIG. 1 is a schematic view showing a configuration of a three-dimensional shaping apparatus.

FIG. 1 is a schematic view showing a configuration of a three-dimensional shaping apparatus 100 including a shaping stage 10 in a first embodiment. In FIG. 1, arrows indicating X, Y, and Z directions orthogonal to one another are shown. The X direction and the Y direction are directions parallel to a horizontal plane, and the Z direction is a direction opposite to a vertical direction. The vertical direction may also be referred to as "gravity direction". The arrows indicating the X, Y, and Z directions are shown as appropriate also in other reference drawings so that the directions shown in the drawings correspond to those in FIG. 1.

The three-dimensional shaping apparatus 100 shapes a three-dimensional shaped article by depositing a shaping material in a shaping face 11 of the shaping stage 10. Hereinafter, the "three-dimensional shaping apparatus" is also simply referred to as "shaping apparatus", and the "three-dimensional shaped article" is also simply referred to as "shaped article". The "shaping material" will be described later. Further, in this specification, the "face" in the shaping face 11 means a concept including not only a face constituted only by a plane, but also one conceivable as a face occupying a given region, and for example, recesses and projections may be formed in the surface thereof.

The shaping stage 10 of the first embodiment is configured such that a relief structure in the shaping face 11 is deformed according to the temperature of the shaping stage 10. The configuration of the shaping stage 10 will be described after other constituent portions included in the shaping apparatus 100 are described.

The shaping apparatus 100 includes, other than the shaping stage 10, a control unit 101 controlling the shaping apparatus 100, a shaping portion 110 forming a shaping material and depositing it in the shaping stage 10, a base stand 210 supporting the shaping stage 10, and a moving mechanism 230 for controlling a deposition position of the shaping material.

The control unit 101 controls the operation of the entire shaping apparatus 100. In the first embodiment, the control unit 101 is constituted by a computer including one or a plurality of processors and a main storage device. The control unit 101 exhibits various functions by allowing the processor to execute a program or an instruction read from the main storage device. At least some of the functions of the control unit 101 may be realized by a hardware circuit.

The control unit 101 controls the shaping portion 110 and the moving mechanism 230 according to shaping data representing the shaped article so as to execute shaping processing for shaping a shaped article by depositing a shaping material on the shaping face 11 of the shaping stage 10 in the below-mentioned shaping step. Further, as described later, the control unit 101 controls a temperature control portion 250 so as to adjust the temperature of the shaping stage 10 and change the relief structure in the shaping face 11 of the shaping stage 10 in the shaping step.

The shaping portion 110 forms a molten shaping material in a paste form and deposits the material at a target position on the shaping face 11 under the control of the control unit 101. The shaping portion 110 includes a material supply portion 20 being a supply source of a raw material MR, a forming portion 30 converting the raw material MR into a shaping material, and an ejecting portion 60 ejecting the shaping material.

The material supply portion 20 supplies the raw material MR for forming the shaping material to the forming portion 30. The material supply portion 20 is constituted by, for example, a hopper housing the raw material MR. The material supply portion 20 has a discharge port below. The discharge port is coupled to the forming portion 30 through a communication path 22. In the first embodiment, the raw material MR is fed to the material supply portion 20 in the form of a pellet, a powder, or the like.

The forming portion 30 forms the shaping material in a paste form by melting the raw material MR supplied from the material supply portion 20 so as to exhibit fluidity, and guides the material to the ejecting portion 60. The forming portion 30 includes a screw case 31, a driving motor 32, a flat screw 40, and a screw facing portion 50.

The flat screw 40 has a substantially cylindrical shape in which a height in an axial direction being a direction along a center axis thereof is smaller than a diameter thereof. The flat screw 40 is placed so that the axial direction thereof is parallel to the Z direction, and rotates along a circumferential direction. In the first embodiment, the center axis of the flat screw 40 coincides with a rotation axis RX thereof. In FIG. 1, the rotation axis RX of the flat screw 40 is indicated by an alternate long and short dash line.

The flat screw 40 is housed in the screw case 31. The flat screw 40 at an upper face 47 side is coupled to the driving motor 32 and is rotated in the screw case 31 by a rotational driving force generated by the driving motor 32. The driving motor 32 is driven under the control of the control unit 101.

Figure 2:
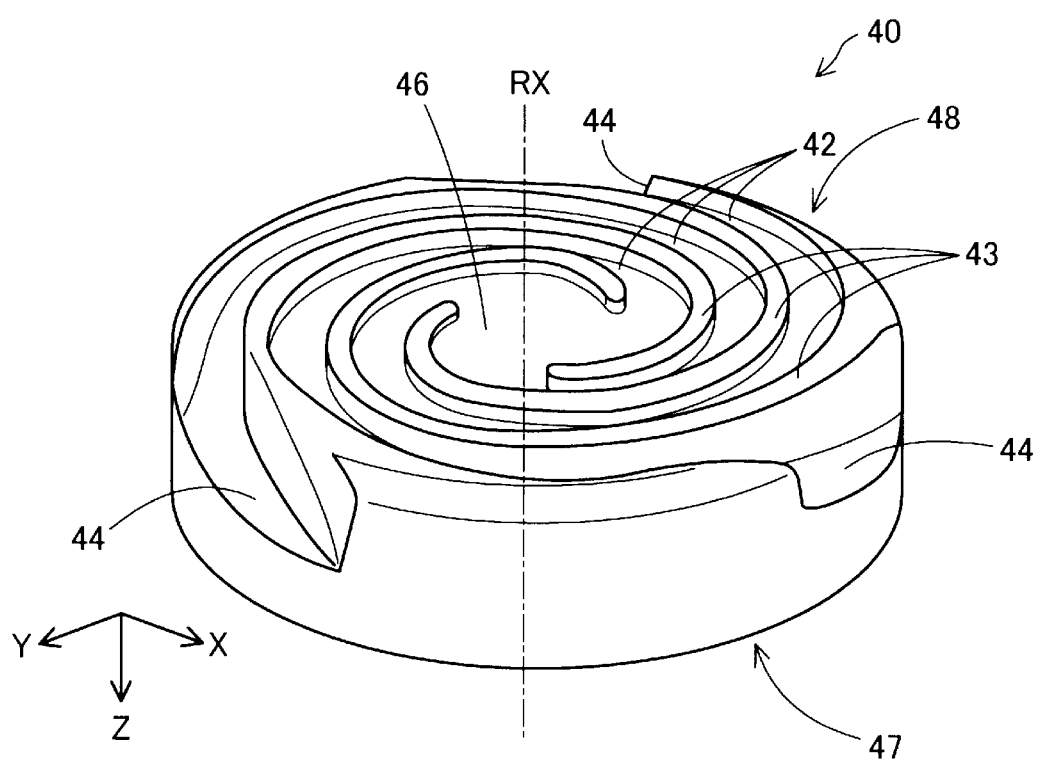
FIG. 2 is a schematic perspective view showing a configuration of a flat screw.

In the flat screw 40, a scroll groove 42 is formed in a lower face 48 being a face crossing the rotation axis RX. Hereinafter, the lower face 48 of the flat screw 40 is also referred to as "groove forming face 48". As shown in FIG. 2 to be referred to later, the scroll groove 42 is coupled to a material inflow port 44 opening to a face at an outer circumferential side of the flat screw 40. The scroll groove 42 extends in a spiral shape toward a central portion 46 through which the rotation axis RX of the flat screw 40 passes from the material inflow port 44.

The groove forming face 48 of the flat screw 40 faces an upper face 52 of the screw facing portion 50, and a space is formed between the scroll groove 42 of the groove forming face 48 and the upper face 52 of the screw facing portion 50. The communication path 22 of the material supply portion 20 described above is coupled to the scroll groove 42 through the material inflow port 44. In the shaping portion 110, the raw material MR is supplied to the space between the scroll groove 42 and the screw facing portion 50 through the communication path 22 from the material supply portion 20. Specific configurations of the flat screw 40 and the scroll groove 42 will be described later.

In the screw facing portion 50, a heater 58 for heating the raw material MR supplied into the scroll groove 42 of the rotating flat screw 40 is embedded. The raw material MR supplied into the scroll groove 42 of the flat screw 40 flows along the scroll groove 42 by rotation of the flat screw 40 while being melted in the scroll groove 42 and is guided to the central portion 46 of the flat screw 40 as the shaping material. The shaping material in a paste form exhibiting fluidity flowing into the central portion 46 is supplied to the ejecting portion 60 through a communication hole 56 provided at the center of the screw facing portion 50. In the shaping material, it is not necessary that all types of substances constituting the shaping material be melted. It is sufficient to convert the shaping material into a state where it has fluidity as a whole by melting at least some types of substances among the substances constituting the shaping material.

The ejecting portion 60 includes a nozzle 61 ejecting the shaping material and a flow path 65 guiding the shaping material formed in the forming portion 30 to the nozzle 61. The nozzle 61 is coupled to the communication hole 56 of the screw facing portion 50 through the flow path 65. The nozzle 61 ejects the shaping material formed in the forming portion 30 toward the shaping stage 10 on the base stand 210 from an ejection port 62 at a tip. In the first embodiment, the flow path 65 extends along the Z direction, and the flow path 65 and the nozzle 61 are arranged along the Z direction. In the flow path 65, a valve mechanism or the like for controlling the flow of the shaping material may be provided.

The base stand 210 is placed below the nozzle 61. The shaping stage 10 is mounted on the base stand 210 as described above, and the shaping face 11 of the shaping stage 10 is opposed to the ejection port 62 of the nozzle 61. In the first embodiment, the shaping stage 10 is placed on the base stand 210 so that the shaping face 11 becomes substantially horizontal, that is, becomes parallel to the X and Y directions.

The moving mechanism 230 changes a relative positional relationship between the base stand 210 and the nozzle 61, that is, a relative positional relationship between the shaping stage 10 and the nozzle 61 under the control of the control unit 101. In the first embodiment, the position of the nozzle 61 is fixed, and the moving mechanism 230 moves the base stand 210. The moving mechanism 230 is constituted by a 3-axis positioner moving the base stand 210 in the three-axis directions: X, Y, and Z directions by a driving force of three motors M.

In another embodiment, in place of the configuration in which the shaping stage 10 is moved by the moving mechanism 230, a configuration in which the moving mechanism 230 moves the nozzle 61 with respect to the shaping stage 10 in a state where the positions of the base stand 210 and the shaping stage 10 are fixed may be adopted. Even in such a configuration, the relative position of the nozzle 61 with respect to the shaping stage 10 can be changed. Further, in another embodiment, a configuration in which the moving mechanism 230 moves each of the base stand 210 and the nozzle 61, thereby changing the relative positions of the shaping stage 10 and the nozzle 61 may be adopted.

The shaping apparatus 100 further includes a chamber 240 being a processing chamber in which shaping is performed, and a temperature control portion 250 controlling the room temperature in the chamber 240. The shaping portion 110, the base stand 210, and the moving mechanism 230 are housed in the chamber 240. In the shaping apparatus 100, a shaped article is shaped in the chamber 240.

In the chamber 240, further the temperature control portion 250 is housed. The temperature control portion 250 is constituted by, for example, a heat exchanger in which a refrigerant whose temperature was adjusted flows inside. The control unit 101 adjusts the temperature in the chamber 240 by the temperature control portion 250 and controls the temperature of the shaping stage 10. The temperature control portion 250 may be placed in the vicinity of the shaping stage 10 for increasing the temperature controllability of the shaping stage 10.

FIG. 2 is a schematic perspective view showing a configuration of the flat screw 40 at a groove forming face 48 side. In FIG. 2, the position of the rotation axis RX of the flat screw 40 in the forming portion 30 is indicated by an alternate long and short dash line.

The central portion 46 of the groove forming face 48 of the flat screw 40 is configured as a recess portion to which one end of the scroll groove 42 is coupled. The central portion 46 is opposed to the communication hole 56 of the screw facing portion 50 shown in FIG. 1. In the first embodiment, the central portion 46 crosses the rotation axis RX. The scroll groove 42 spirally extends so as to draw an arc toward the outer circumference of the flat screw 40 from the central portion 46. The scroll groove 42 may be configured to helically extend. The scroll groove 42 continues up to the material inflow port 44 formed in a face at an outer circumferential side of the flat screw 40. In the groove forming face 48, a projecting strip portion 43 that constitutes a side wall portion of the scroll groove 42 and that extends along each scroll groove 42 is provided. The scroll groove 42 is desirably configured such that the cross-sectional area in a cross section orthogonal to the center axis of the scroll groove 42 becomes smaller toward the central portion 46 from the material inflow port 44. According to this, the pressure at the central portion 46 when plasticizing the raw material MR can be further increased.

In FIG. 2, an example of the flat screw 40 having three scroll grooves 42 and three projecting strip portions 43 is shown. The number of scroll grooves 42 or projecting strip portions 43 provided in the flat screw 40 is not limited to 3. In the flat screw 40, only one scroll groove 42 may be provided, or two or more scroll grooves 42 may be provided. Further, an arbitrary number of projecting strip portions 43 may be provided according to the number of scroll grooves 42. In FIG. 2, an example of the flat screw 40 in which the material inflow port 44 is formed at three sites is shown. The number of material inflow ports 44 provided in the flat screw 40 is not limited to 3. In the flat screw 40, the material inflow port 44 may be provided at only one side or may be provided at two or more sites.

Figure 3:
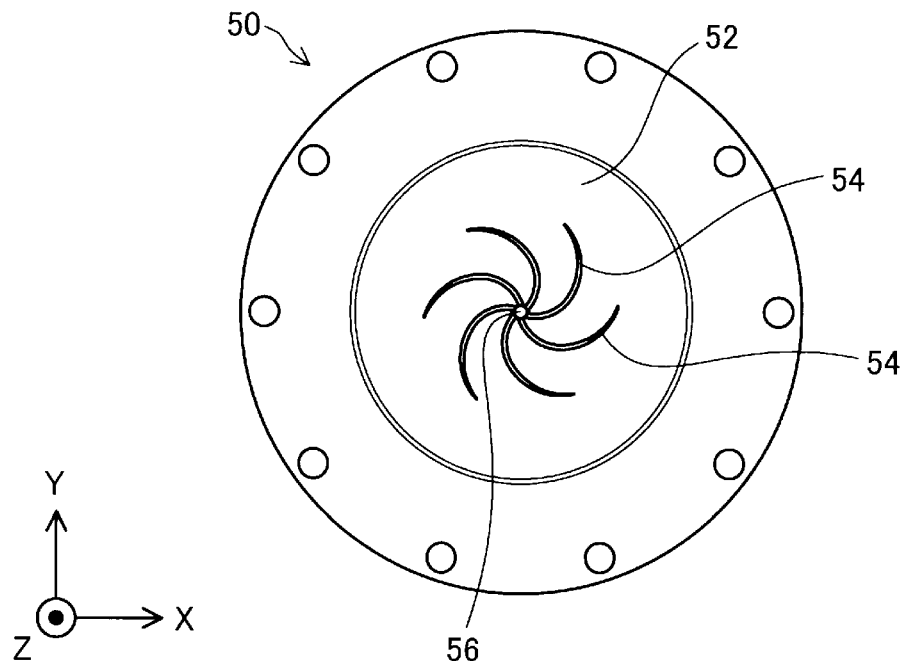
FIG. 3 is a schematic plan view showing a configuration of a screw facing portion.

FIG. 3 is a schematic plan view showing the screw facing portion 50 at an upper face 52 side. The upper face 52 of the screw facing portion 50 is opposed to the groove forming face 48 of the flat screw 40 as described above. Hereinafter, this upper face 52 is also referred to as "screw opposed face 52". At the center of the screw opposed face 52, the above-mentioned communication hole 56 for supplying the shaping material to the nozzle 61 is formed. In the screw opposed face 52, a plurality of guide grooves 54 that are coupled to the communication hole 56 and that spirally extend toward the outer circumference from the communication hole 56 are formed. The plurality of guide grooves 54 have a function to guide the shaping material flowing in the central portion 46 of the flat screw 40 to the communication hole 56. As previously described with reference to FIG. 1, in the screw facing portion 50, the heater 58 is embedded. Melting of the raw material MR in the forming portion 30 is realized by heating of the heater 58 and rotation of the flat screw 40.

FIGS. 1 and 2 are referred to. When the flat screw 40 rotates, the raw material MR supplied from the material inflow port 44 is guided to the scroll groove 42 and moves toward the central portion 46 while being heated in the scroll groove 42. The raw material MR is melted to enhance the fluidity as approaching the central portion 46 and is converted into the shaping material. The shaping material gathered at the central portion 46 is guided to the flow path 65 of the nozzle 61 through the communication hole 56 by the internal pressure generated at the central portion 46 and ejected from the ejection port 62.

According to the forming portion 30 using the flat screw 40, when the raw material MR is plasticized, the pressure in the scroll groove 42 is increased as approaching the central portion 46, and therefore, the kneading degree of the shaping material to be finally formed is increased. Further, air present in voids in the raw material MR is pushed out toward the material inflow port 44 side by the pressure generated in the scroll groove 42, and therefore, degassing of the shaping material is promoted.

FIG. 1 is referred to. In the forming portion 30, by adopting the flat screw 40 having a small size in the Z direction, a range occupied in the Z direction by the path for melting the raw material MR and guiding it to the nozzle 61 becomes small. In this manner, in the shaping apparatus 100, by utilizing the flat screw 40, the size of the mechanism for forming the shaping material is reduced.

In the shaping apparatus 100, by utilizing the flat screw 40, a configuration in which the shaping material having fluidity is formed and pressure-fed to the nozzle 61 is simply realized. According to this configuration, control of the ejection amount of the shaping material from the nozzle 61 is possible by control of the rotation speed of the flat screw 40, and control of the ejection amount of the shaping material from the nozzle 61 can be facilitated.

Materials of the shaped article to be used in the shaping apparatus 100 will be described. In the shaping apparatus 100, for example, the shaped article can be shaped by using various materials such as a material having thermoplasticity, a metal material, and a ceramic material as a main material. Here, the "main material" means a material mainly used for forming the shape of the shaped article and means a material whose content accounts for 50 wt % or more in the shaped article. The above-mentioned shaping material includes a material obtained by melting such a main material singly or a material formed into a paste by melting some components to be contained together with the main material.

When a material having thermoplasticity is used as the main material, in the forming portion 30, the shaping material is formed by plasticization of the material. The "plasticization" means that heat is applied to the material having thermoplasticity and the material is melted.

As the material having thermoplasticity, for example, the following thermoplastic resin materials can be used.

Examples of Thermoplastic Resin Material:

general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive or the like such as a wax, a flame retardant, an antioxidant, or a heat stabilizer may be mixed. The material having thermoplasticity is converted into a plasticized and melted state by rotation of the flat screw 40 and heating of the heater 58 in the forming portion 30. The shaping material formed by melting the material having thermoplasticity is cured by decreasing the temperature after being ejected from the nozzle 61.

The material having thermoplasticity is desirably injected from the nozzle 61 in a completely melted state by being heated to a temperature not lower than the glass transition point thereof. For example, an ABS resin has a glass transition point of about 120° C. and the temperature thereof is desirably about 200° C. when it is ejected from the nozzle 61. In order to eject the shaping material in a high temperature state in this manner, a heater may be provided around the nozzle 61.

In the shaping apparatus 100, in place of the above-mentioned material having thermoplasticity, for example, the following metal material may be used as the main material. In that case, it is desirable that a component melting when forming the shaping material is mixed in a powder material obtained by pulverizing the following metal material into a powder, and the resulting material is fed to the forming portion 30 as the raw material MR.

Examples of Metal Material:

a single metal such as magnesium (Mg), iron (Fe), cobalt (Co), chromium (Cr), aluminum (Al), titanium (Ti), copper (Cu), or nickel (Ni), or an alloy containing one or more of these metals Examples of Alloy Described Above:

a maraging steel, stainless steel, cobalt-chromium-molybdenum, a titanium alloy, a nickel alloy, an aluminum alloy, a cobalt alloy, or a cobalt-chromium alloy In the shaping apparatus 100, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material placed in the base stand 210 may be cured by sintering.

The powder material of the metal material or the ceramic material to be fed to the material supply portion 20 as the raw material MR may be a mixed material obtained by mixing a plurality of types of single metal powders or alloy powders or ceramic material powders. Further, the powder material of the metal material or the ceramic material may be coated with, for example, a thermoplastic resin as exemplified above or a thermoplastic resin other than these. In that case, in the forming portion 30, the material may be configured to exhibit fluidity by melting the thermoplastic resin.

To the powder material of the metal material or the ceramic material to be fed to the material supply portion 20 as the raw material MR, for example, a solvent as described below can also be added. As the solvent, one type or two or more types in combination selected from the following solvents can be used.

Examples of Solvent:

water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl n-butyl ketone, diisopropyl ketone, and acetyl acetone, alcohols such as ethanol, propanol, and butanol, tetra-alkyl ammonium acetates, sulfoxide-based solvents such as dimethyl sulfoxide and diethyl sulfoxide, pyridine-based solvents such as pyridine, γ-picoline, and 2,6-lutidine, ionic liquids such as tetra-alkyl ammonium acetate (for example, tetrabutyl ammonium acetate, etc.) and butyl carbitol acetate, and the like In addition thereto, to the powder material of the metal material or the ceramic material to be fed to the material supply portion 20 as the raw material MR, for example, a binder as described below can also be added.

Figure 4A:
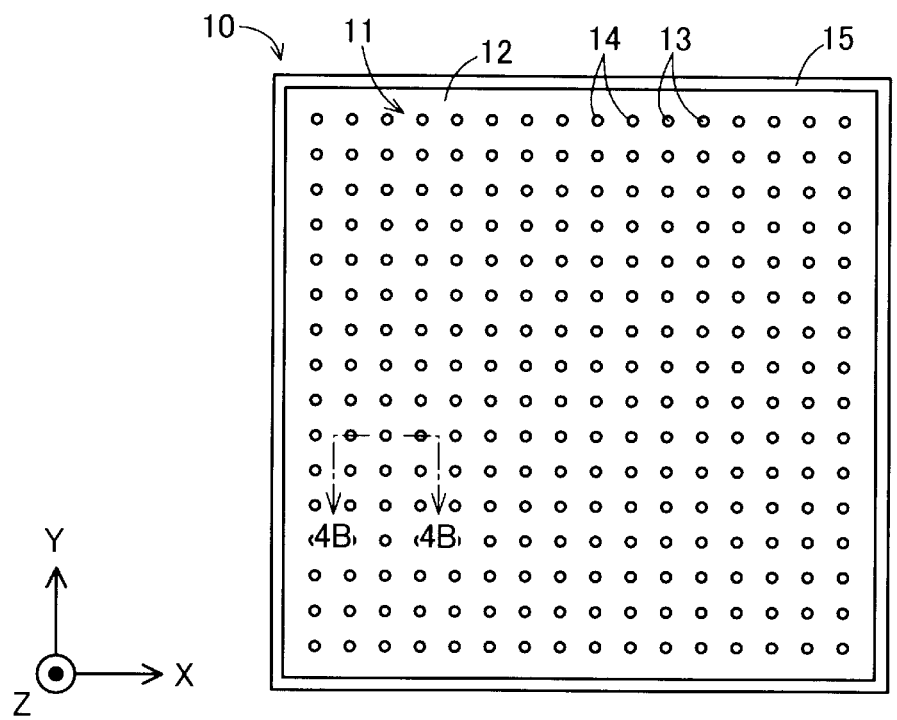
FIG. 4A is a schematic plan view showing a shaping stage in a first embodiment at a shaping face side.
Figure 4B:
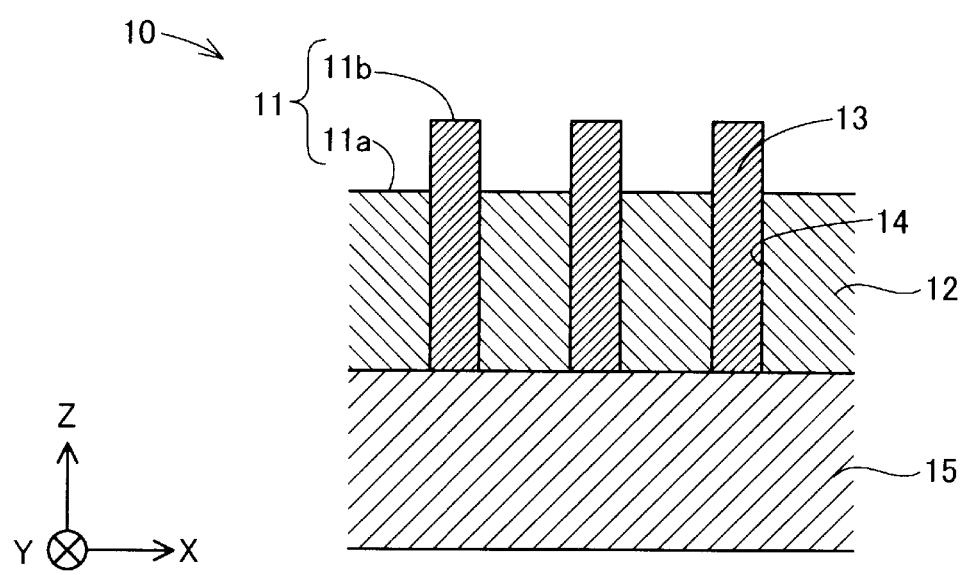
FIG. 4B is a schematic cross-sectional view showing the shaping stage in the first embodiment.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or a thermoplastic resin other than these The configuration of the shaping stage 10 will be described with reference to FIGS. 1, 4A, and 4B. FIG. 4A is a schematic plan view showing the shaping stage 10 at the shaping face 11 side. FIG. 4B is a schematic cross-sectional view showing the shaping stage 10 taken along the line 4B-4B shown in FIG. 4A.

The shaping stage 10 includes a first member 12 constituting a body portion and a substrate 15 supporting the first member 12. In the first embodiment, the first member 12 is constituted by a plate-like member having a thickness of about 1 to 10 mm. In the first embodiment, the first member 12 is constituted by a resin material. The first member 12 is constituted by, for example, polytetrafluoroethylene (PTFE), an ABS resin, or the like.

As shown in FIG. 4B, the first member 12 has a plurality of penetration portions 14 and a first shaping face portion 11a that is present in peripheries of the penetration portions 14 and that is included in the shaping face 11. The first shaping face portion 11a is constituted by a surface of the first member 12 constituting a peripheral portion of each penetration portion 14. In the first embodiment, the penetration portion 14 is a penetration hole having an opening shape of a perfect circle as shown in FIG. 4A. In this specification, the "penetration portion" means a concept including not only a bottomless hole portion, but also a bottomless groove portion or slit, and the like. The opening diameter of the penetration portion 14 may be, for example, from about 1 to 10 μm. In the first embodiment, the penetration portions 14 are two-dimensionally arranged over the entire shaping face 11. The penetration portions 14 are arranged at equal intervals in a lattice shape in the X direction and the Y direction. The interval between the penetration portions 14 may be, for example, from about 0.1 to 1 mm.

The arrangement configuration of the penetration portions 14 is not limited to a lattice-shaped arrangement configuration illustrated in FIG. 4A. In another embodiment, the penetration portions 14 may be arranged in a concentric circle, or the arrangement intervals of the penetration portions 14 may be changed for each region of the shaping face 11. For example, the penetration portions 14 may be arranged so that the density becomes higher toward a region at an outer circumferential side than a region at a central portion side. Further, the penetration portions 14 may be irregularly scattered on the shaping face 11. In another embodiment, the opening shape of the penetration portion 14 may not be a perfect circular shape, and may be an elliptical shape, or may be a triangular shape or a rectangular shape, or another polygonal shape.

The substrate 15 is a flat plate-like member having a constant thickness and is placed so as to cover a lower face at an opposite side to the first shaping face portion 11a of the first member 12. The substrate 15 is constituted by, for example, a metal such as Ni. The first member 12 and the substrate 15 are desirably joined and integrated together. According to this, thermal expansion deformation in a direction along the shaping face 11 of the first member 12 is suppressed. However, in another embodiment, the substrate 15 may be omitted.

The shaping stage 10 further includes a second member 13 that has a thermal expansion coefficient different from the first member 12 and that is placed in an internal space of each penetration portion 14 of the first member 12. In the first embodiment, the second member 13 is constituted by a columnar member placed along a depth direction of the penetration portion 14 being a penetration hole, that is, a thickness direction of the first member 12. In the first embodiment, the depth direction of the penetration portion 14 and the thickness direction of the first member 12 are directions parallel to the Z direction. The second member 13 has a second shaping face portion 11b included in the shaping face 11. The second shaping face portion 11b is constituted by a tip face at an opposite side to the substrate 15 of the second member 13. In the first embodiment, the shaping face 11 of the shaping stage 10 has the first shaping face portion 11a of the first member 12 and the second shaping face portions 11b of the second members 13.

In the first embodiment, the shaping stage 10 is configured such that when the temperature of the shaping stage 10 is a predetermined reference temperature, the second shaping face portion 11b included in the second member 13 projects from the first shaping face portion 11a included in the first member 12 as shown in FIG. 1 or 4B. The predetermined reference temperature may be set to, for example, about 18 to 28° C. based on room temperature. Further, it may be configured such that, for example, when the temperature of the shaping stage 10 is the reference temperature, the second shaping face portion 11b of the second member 13 projects from the first shaping face portion 11a of the first member 12 in the thickness direction of the first member 12 by about 5 to 10 μm.

In the first embodiment, the thermal expansion coefficient of the second member 13 is smaller than that of the first member 12. A difference in the thermal expansion coefficient between the first member 12 and the second member 13 may be set to, for example, about 50 to $100 \times 10^{-6}$/K. In the first embodiment, the first member 12 is constituted by a resin material and the second member 13 is constituted by a metal material thereby providing such a difference in the thermal expansion coefficient. By setting the thermal expansion coefficient of the second member 13 smaller than that of the first member 12, when the temperature of the shaping stage 10 is increased, an increment of the thickness in the Z direction by thermal expansion of the first member 12 is larger than an increment of the length in the Z direction by thermal expansion of the second member 13.

In this manner, in the shaping stage 10, when the temperature thereof is the reference temperature, by the first member 12 and the second members 13 placed in the penetration portions 14 thereof, a relief structure is formed in the shaping face 11. Then, by the difference in the thermal expansion coefficient between the first member 12 and the second member 13, when the temperature of the shaping stage 10 is changed, the position of the second shaping face portion 11b with respect to the first shaping face portion 11a is relatively changed, and the relief structure in the shaping face 11 is changed.

Here, for example, it is assumed that the first member 12 is constituted by PTFE, and the second member 13 is constituted by nickel (Ni). Then, the thickness of the first member 12 when the temperature of the shaping stage 10 is the reference temperature at 25° C. is set to 1 mm, and the projecting height of the second member 13 projecting from the penetration portion 14 is set to 2.4 μm. The thermal expansion coefficient of PTFE is $100 \times 10^{-6}$/K, the thermal expansion coefficient of Ni is $12.8 \times 10^{-6}$/K, and the difference in the thermal expansion coefficient between the first member 12 and the second member 13 is $87 \times 10^{-6}$/K. According to such a configuration, when the temperature of the shaping stage 10 is increased by, for example, about 55° C. from the reference temperature of 25° C. to 80° C., the thickness of the first member 12 becomes larger than the length of the second member 13. Therefore, the second shaping face portion 11b of the second member 13 is housed in the penetration portion 14, and the recesses and the projections of the relief structure in the shaping face 11 are inverted.

As described below, the shaping apparatus 100 is configured such that after completion of shaping in the shaping step, the temperature of the shaping stage 10 is changed so as to change the relief structure in the shaping face 11, thereby facilitating separation of the shaped article from the shaping face 11. Further, in the first embodiment, during shaping, by performing shaping in a state where a level difference between the first shaping face portion 11a and the second shaping face portion 11b is provided in the shaping face 11, the fixing property of the shaping material to the shaping face 11 is enhanced.

Figure 5:
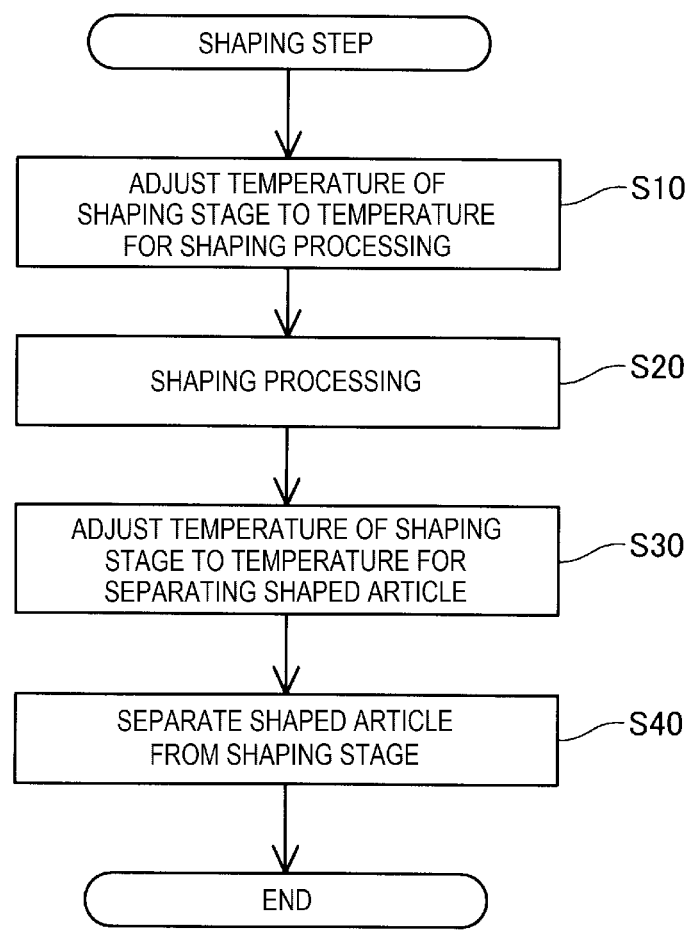
FIG. 5 is an explanatory view showing a flow of a shaping step.

The shaping step performed by the shaping apparatus 100 of the first embodiment will be described with reference to FIGS. 5, 6A, and 6B. FIG. 5 is an explanatory view showing a flow of the shaping step. In the shaping apparatus 100, the control unit 101 performs control according to the control method of the first embodiment and performs the shaping step as follows. In this shaping step, the temperature control portion 250 performs temperature control of the shaping stage 10 so that the temperature difference between a first temperature being a processing temperature during shaping and a second temperature being a control temperature after completion of shaping becomes not less than a predetermined temperature difference.

Step S10 is a step of adjusting the temperature of the shaping stage 10 to a temperature for shaping processing. In the first embodiment, the control unit 101 adjusts the temperature of the shaping stage 10 by changing the temperature in the chamber 240 using the temperature control portion 250. The control unit 101 controls the temperature in the chamber 240 to the processing temperature being the predetermined first temperature using the temperature control portion 250. The processing temperature is a predetermined temperature according to the reference temperature of the shaping stage 10. For example, when the reference temperature is from 18 to 25° C., the processing temperature may be determined to be a temperature of about 12 to 30° C. After controlling the temperature in the chamber 240 to the processing temperature, the control unit 101 may wait for a period until the temperature of the shaping stage 10 reaches the reference temperature. In the first embodiment, by adjusting the temperature of the shaping stage 10 to the reference temperature, the second shaping face portion 11b of the second member 13 in the shaping face 11 is brought into a state of projecting from the first shaping face portion 11a of the first member 12.

Figure 6A:
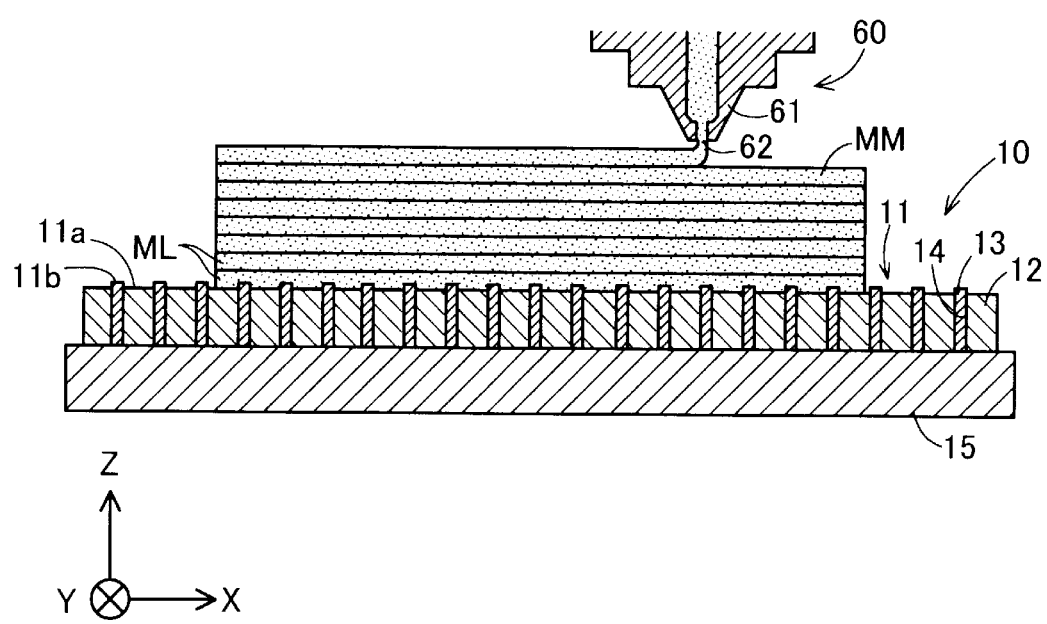
FIG. 6A is a schematic view schematically showing a manner of shaping processing in the first embodiment.

FIG. 6A is a schematic view schematically showing a manner of shaping a shaped article in shaping processing in Step S20. In FIG. 6A, boundaries of material layers ML constituting the shaped article are shown for convenience.

In the shaping processing in Step S20, the control unit 101 shapes the shaped article as follows. The control unit 101 ejects a shaping material MM from the nozzle 61 while changing the position of the nozzle 61 with respect to the shaping stage 10 to a direction crossing a direction toward the shaping stage 10 from the nozzle 61 according to shaping data. By doing this, the shaping material MM is deposited on the shaping face 11, thereby forming a material layer ML.

After forming one material layer ML, the control unit 101 moves the position of the nozzle 61 in the Z direction being a direction away from the shaping face 11, and further forms and stacks a material layer ML on the previously formed material layer ML. The control unit 101 repeatedly stacks such a material layer ML, thereby shaping the shaped article.

Here, when performing Step S20, as described above, a relief structure in which the second shaping face portions 11b of the second members 13 project from the first shaping face portion 11a of the first member 12 is formed in the shaping face 11. Therefore, during shaping of the shaped article, due to an anchor effect of the second members 13 constituting projection portions of the relief structure, the fixing property of the shaping material MM constituting the material layer ML being the lowermost layer to the shaping face 11 is enhanced. According to this, the shaping material MM of the material layer ML being the lowermost layer is prevented from flowing in a direction along the shaping face 11, and the shaping material MM is prevented from being placed at a position shifted from a predetermined position. Further, when the shaping material MM is cured, shrinkage of the material layer ML being the lowermost layer in a direction along the shaping face 11 is suppressed, and occurrence of warpage of the bottom face of the shaped article is suppressed. In this manner, in the shaping processing in Step S20, the fixing property of the shaping material MM to the shaping stage 10 is enhanced due to the relief structure caused in the shaping face 11 by temperature control of the shaping stage 10, and therefore, the shaping accuracy of the shaped article is enhanced.

Figure 6B:
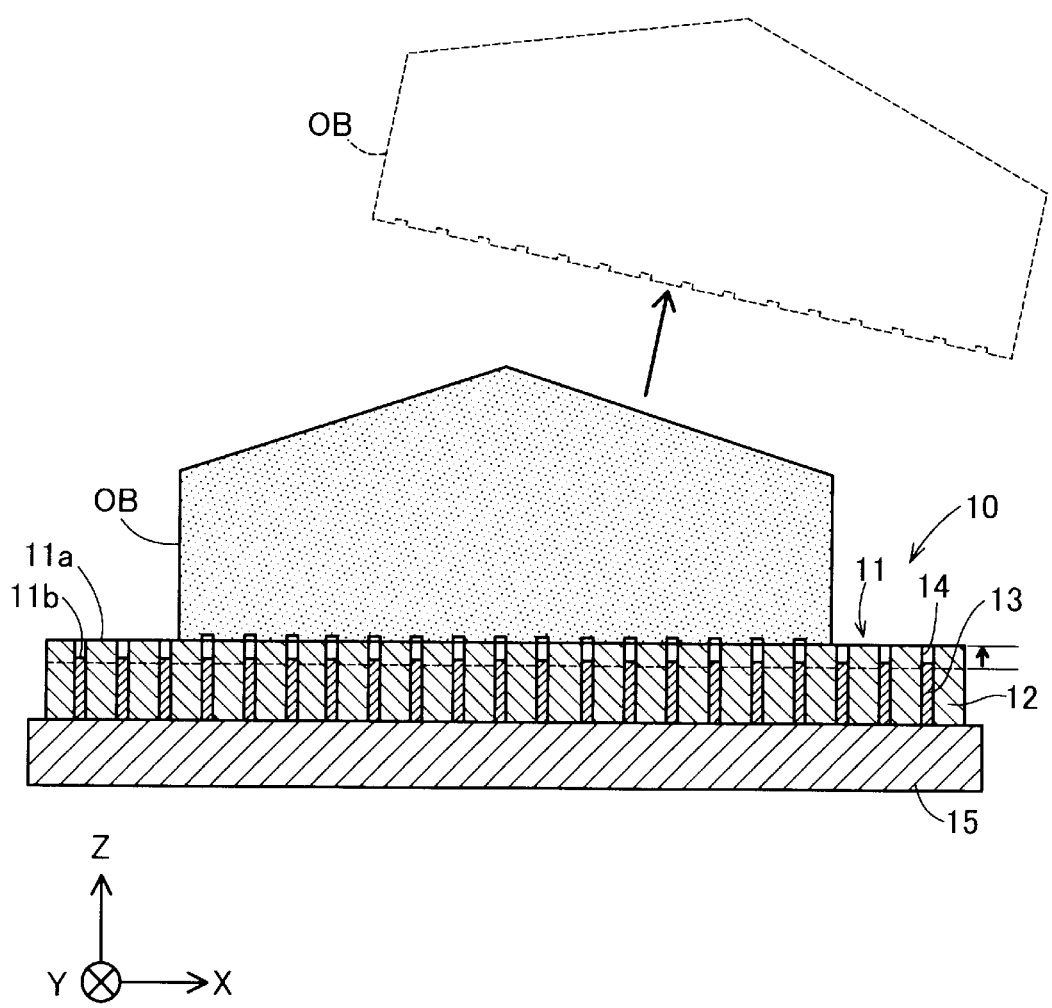
FIG. 6B is a schematic view schematically showing a step of separating a three-dimensional shaped article in the first embodiment.

FIG. 6B is a schematic view schematically showing a step of separating a shaped article OB after completion of shaping from the shaping stage 10. In FIG. 6B, the shaped article OB separated from the shaping stage 10 is indicated by a broken line for convenience.

Step S30 is a step of adjusting the temperature of the shaping stage 10 to the predetermined second temperature for separating the shaped article OB after completion of shaping from the shaping stage 10. The control unit 101 increases the temperature of the shaping stage 10 by setting the temperature in the chamber 240 to a predetermined high temperature higher than the temperature set in Step S10 using the temperature control portion 250 after completion of shaping of the shaped article OB. According to this, a temperature difference not less than the predetermined temperature between during shaping of the shaped article OB and after completion of shaping of the shaped article OB is caused and each of the first member 12 and the second member 13 of the shaping stage 10 are thermally expanded. This temperature difference is determined so that the thermal expansion amount of the first member 12 is larger than the thermal expansion amount of the second member 13 by a predetermined amount. In the first embodiment, the temperature difference may be set to, for example, about 50 to 60° C.

By increasing the temperature of the shaping stage 10 from a low temperature state to a high temperature state in this manner, as shown in FIG. 6B, the thickness of the first member 12 is increased, and the height of the second member 13 projecting from the first shaping face portion 11a of the first member 12 is decreased. In the first embodiment, the temperature of the shaping stage 10 is increased until the second shaping face portion 11b of the second member 13 is recessed from the first shaping face portion 11a of the first member 12, and the recesses and the projections of the relief structure formed in the shaping face 11 are inverted. By doing this, the second member 13 stuck into the bottom face of the shaped article OB is separated from the bottom face of the shaped article OB, and therefore, the shaped article OB is in a state of being easily separated from the shaping stage 10. In Step S40, the shaped article is separated from the shaping stage 10 as indicated by the broken line in FIG. 6B in this state. The recesses and the projections in the bottom face of the shaped article may be removed by polishing processing or the like after Step S40.

One example of a method of producing the shaping stage 10 will be described with reference to FIGS. 7A to 7F. FIGS. 7A to 7F schematically show the contents of steps of producing the shaping stage 10, respectively.

Figure 7A:
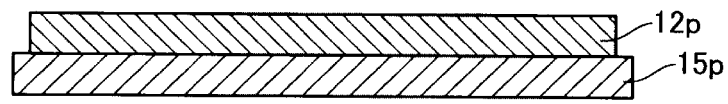
FIG. 7A is a schematic view showing a first step in one example of a method of producing a shaping stage.
Figure 7B:
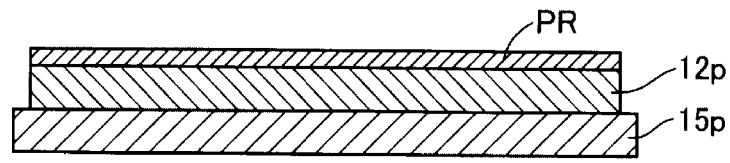
FIG. 7B is a schematic view showing a second step in one example of the method of producing a shaping stage.
Figure 7C:
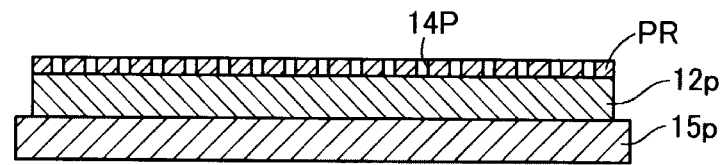
FIG. 7C is a schematic view showing a third step in one example of the method of producing a shaping stage.

In a first step shown in FIG. 7A, a metal plate 15p constituting the substrate 15 and a resin plate 12p being a base material of the first member 12 are prepared and adhered or fused to each other. In a second step shown in FIG. 7B, a photoresist PR is applied to a surface of the resin plate 12p. In a third step shown in FIG. 7C, by a photolithography method, the photoresist PR is exposed and developed, thereby patterning an arrangement pattern 14P of the penetration portions 14 in the first member 12. This patterning may be performed by an imprint method or the like in place of the photolithography method.

Figure 7D:
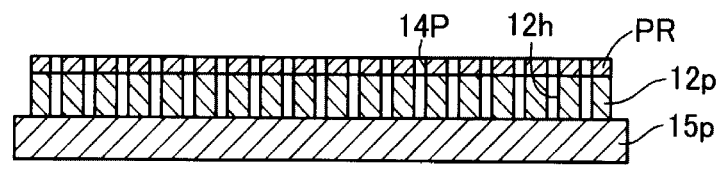
FIG. 7D is a schematic view showing a fourth step in one example of the method of producing a shaping stage.
Figure 7E:
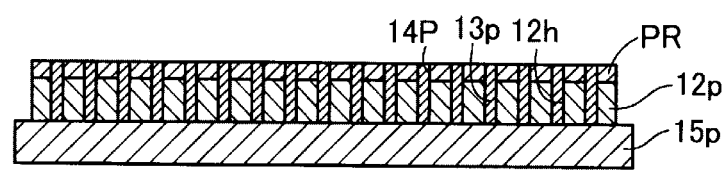
FIG. 7E is a schematic view showing a fifth step in one example of the method of producing a shaping stage.
Figure 7F:
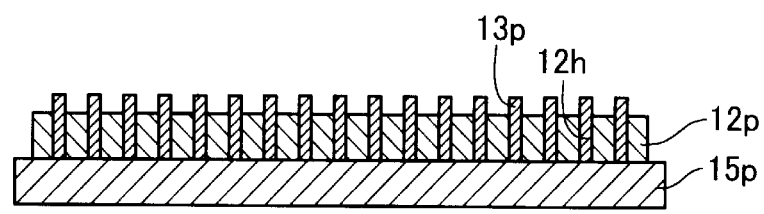
FIG. 7F is a schematic view showing a sixth step in one example of the method of producing a shaping stage.

In a fourth step shown in FIG. 7D, penetration holes 12h penetrating the resin plate 12p are formed by etching using the photoresist PR as a mask. This penetration hole 12h becomes the penetration portion 14 in the first member 12. In a fifth step shown in FIG. 7E, a metal base material 13p constituting the second member 13 is placed in the penetration hole 12h. In the first embodiment, the metal base materials 13p are formed at a time by utilizing, for example, a plating method such as electroplating. In another embodiment, the metal base materials 13p may be inserted one by one into the penetration holes 12h corresponding thereto. The length of the metal base material 13p may be appropriately set in consideration of the thermal expansion coefficient of each of the resin plate 12p and the metal base material 13p, the thickness of the resin plate 12p, the predetermined reference temperature of the shaping stage 10, and the position of the second shaping face portion 11b with respect to the first shaping face portion 11a at the reference temperature. In a sixth step shown in FIG. 7F, the photoresist PR is peeled using a peeling liquid. According to the above-mentioned steps, the shaping stage 10 is completed.

As described above, according to the shaping stage 10, the shaping apparatus 100, and the control method of the shaping apparatus 100 of the first embodiment, the relief structure in the shaping face 11 can be simply changed according to the stage of the shaping step by temperature control of the shaping stage 10. Therefore, by changing the relief structure in the shaping face 11 of the shaping stage 10 after completion of shaping, separation of the shaped article from the shaping face 11 can be facilitated. Further, in the first embodiment, a level difference between the first shaping face portion 11a and the second shaping face portion 11b is also provided during shaping of the shaped article, and therefore, the fixing property of the shaping material in the shaping face 11 is enhanced, and flowing or shrinkage deformation thereof is suppressed. According to the shaping stage 10, the shaping apparatus 100, and the control method of the shaping apparatus 100 of the first embodiment, such an effect can be obtained with a simple configuration in which addition of a complicated mechanical mechanism is suppressed. In addition thereto, according to the shaping stage 10, the shaping apparatus 100, and the control method of the shaping apparatus 100 of the first embodiment, various operational effects described in the first embodiment can be brought about.

2. Second Embodiment

A shaping step according to a control method of a second embodiment performed by the control unit 101 will be described with reference to FIGS. 8A and 8B. The control method of the second embodiment is performed by the shaping apparatus 100 having the same configuration as described in the first embodiment. Also in the second embodiment, the shaping apparatus 100 includes the same shaping stage 10 as described in the first embodiment. The shaping step of the second embodiment is the same as the shaping step described in the first embodiment except that high and low temperatures to be set in Step S10 and Step S30 are exchanged. In the shaping step of the second embodiment, Step S10 to Step S40 are performed according to the flow in FIG. 5.

Figure 8A:
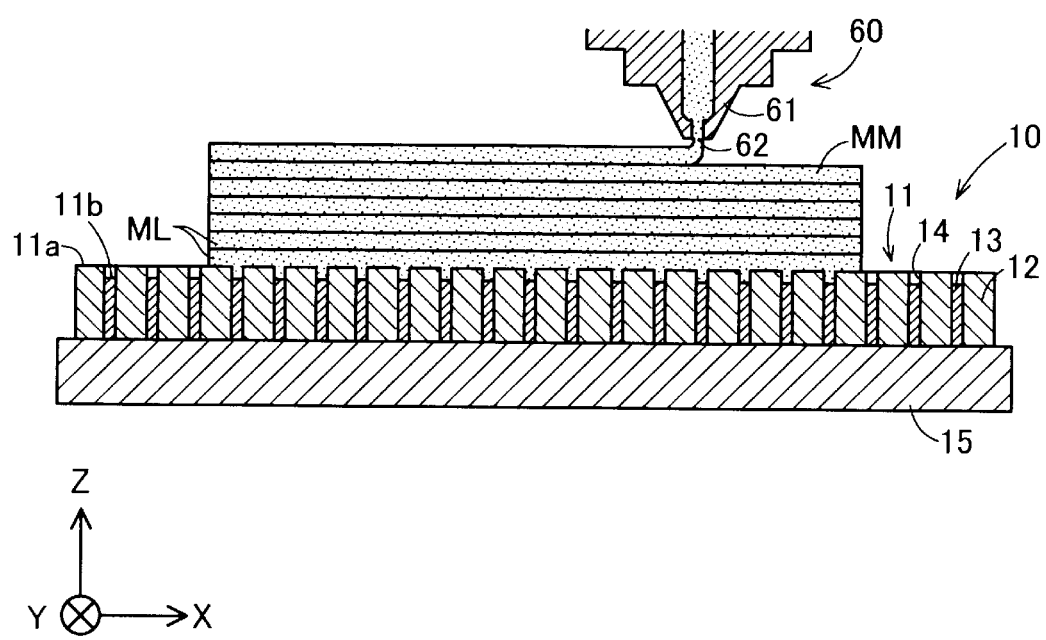
FIG. 8A is a schematic view schematically showing a manner of shaping processing in a second embodiment.

FIG. 8A is a schematic view schematically showing a manner of shaping a shaped article in shaping processing in Step S20 of the second embodiment. In Step S10, the control unit 101 sets the temperature in the chamber 240 to a predetermined processing temperature higher than the reference temperature of the shaping stage 10 by the temperature control portion 250. When the reference temperature of the shaping stage 10 is from 18 to 25° C. based on room temperature, the processing temperature in Step S10 may be set to, for example, about 70 to 90° C. By this adjustment of the processing temperature in the chamber 240, the temperature of the shaping stage 10 is adjusted to a temperature higher than the reference temperature. According to this, as shown in FIG. 8A, the shaping stage 10 is brought into a state where the thickness of the first member 12 is longer than the length of the second member 13. In the shaping stage 10 in this state, the entire second member 13 is inserted into the penetration portion 14, and the second shaping face portion 11b is located at a position recessed from the first shaping face portion 11a, thereby forming a relief structure in the shaping face 11. In Step S20 of the second embodiment, part of the shaping material MM constituting the material layer ML being the lowermost layer is inserted into the penetration portions 14 constituting the above-mentioned relief structure, whereby the fixing property of the shaping material MM to the shaping face 11 is enhanced. Therefore, the shaping accuracy of the shaped article in the shaping processing is enhanced.

Figure 8B:
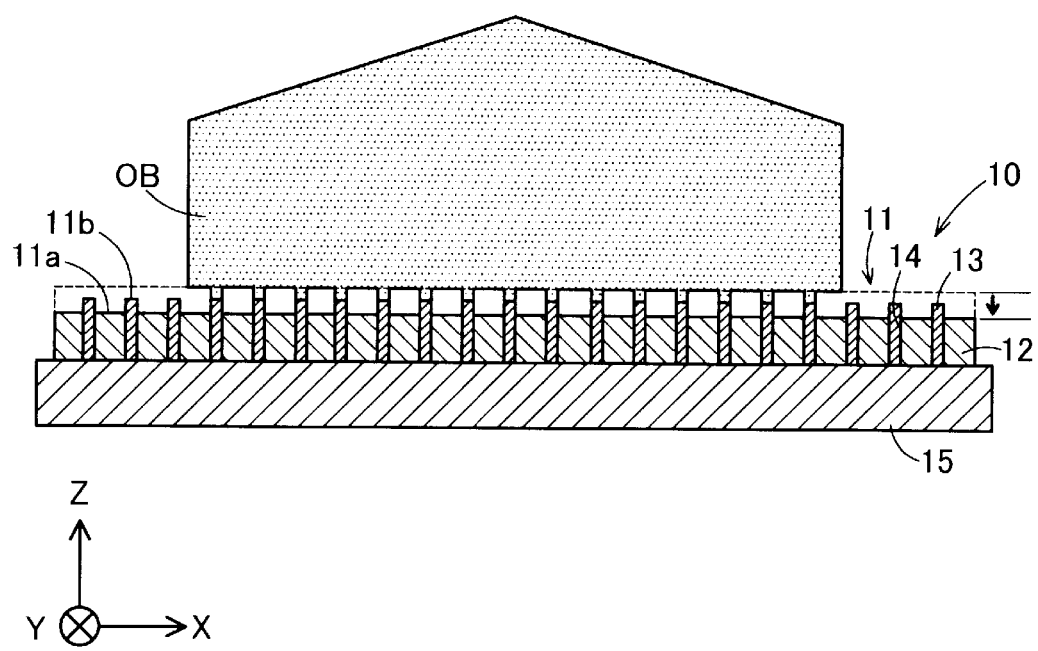
FIG. 8B is a schematic view schematically showing a step of separating a three-dimensional shaped article in the second embodiment.

FIG. 8B is a schematic view schematically showing a step of separating the shaped article from the shaping stage 10 in Steps S30 to S40 of the second embodiment. In Step S30 of the second embodiment, after completion of shaping of the shaped article, the control unit 101 decreases the temperature of the shaping stage 10 to the reference temperature. The control unit 101 decreases the temperature in the chamber 240 from the processing temperature being a high temperature set in Step S10 to a low temperature not higher than the reference temperature of the shaping stage 10 by the temperature control portion 250. By doing this, a temperature difference not less than the predetermined temperature between during shaping of the shaped article and after completion of shaping of the shaped article is caused in the shaping stage 10. This temperature difference is determined so that at least the thermal shrinkage amount of the first member 12 is larger than the thermal shrinkage amount of the second member 13 by a predetermined amount. The control unit 101 degreases the temperature of the shaping stage 10 from the temperature adjusted in Step S10 by, for example, about 50 to 60° C.

By decreasing the temperature of the shaping stage 10, as shown in FIG. 8B, the thickness of the first member 12 is made smaller than the length of the second member 13, and the second shaping face portion 11b is in a state of projecting from the first shaping face portion 11a. By doing this, the bottom face of the shaped article OB can be separated from the first shaping face portion 11a of the first member 12 while supporting the shaped article OB by the second shaping face portion 11b at the tip of the second member 13, and the shaped article OB can be brought into a state of being easily separated from the shaping stage 10. In Step S40, in this state, the shaped article OB is separated from the shaping stage 10. The recesses and the projections in the bottom face of the shaped article OB may be removed by polishing processing or the like after Step S40.

As described above, even the control method of the shaping apparatus 100 according to the second embodiment can facilitate separation of the shaped article after completion of shaping from the shaping face 11 by temperature control of the shaping stage 10. Further, the fixing property of the shaping material MM to the shaping face 11 during shaping of the shaped article can also be enhanced. In addition thereto, according to the shaping stage 10, the shaping apparatus 100, and the control method of the shaping apparatus 100 of the second embodiment, various operational effects similar to those described in the first embodiment can be brought about.

3. Third Embodiment

Figure 9:
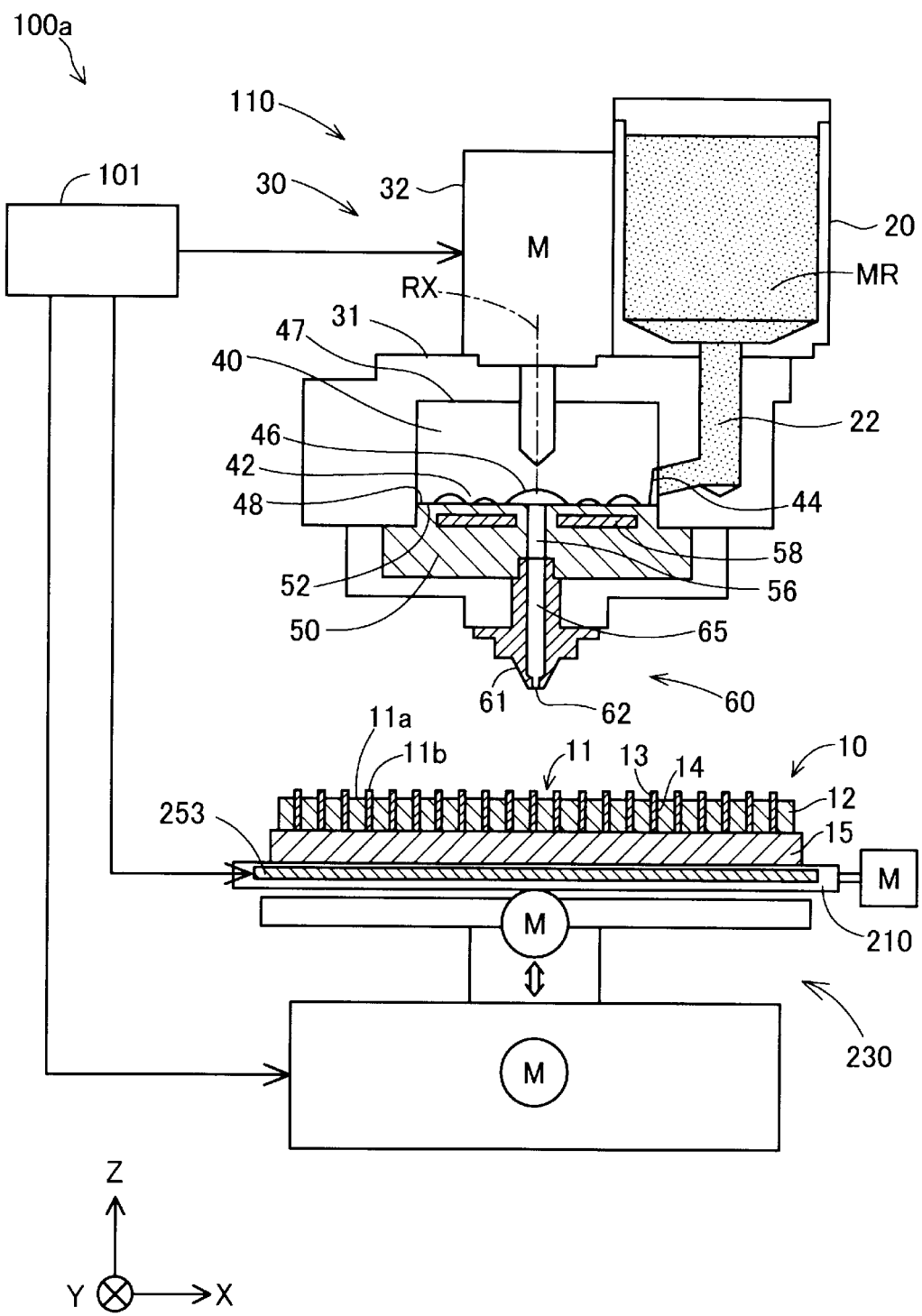
FIG. 9 is a schematic view showing a configuration of a shaping apparatus of a third embodiment.

FIG. 9 is a schematic view showing a configuration of a shaping apparatus 100a of a third embodiment. The shaping apparatus 100a of the third embodiment is different from the shaping apparatus 100 of the first embodiment in that it does not include the chamber 240, and in place of the temperature control portion 250 described in the first embodiment, a temperature control portion 253 of the third embodiment is incorporated inside the base stand 210. The shaping apparatus 100a of the third embodiment includes the shaping stage 10 described in the first embodiment and performs the shaping step in FIG. 5 described in the first embodiment.

The temperature control portion 253 of the third embodiment is constituted by a heat exchanger provided inside the base stand 210. The temperature control portion 253 can heat or cool the shaping stage 10 mounted on the base stand 210 by heat exchange with a refrigerant supplied from outside.

In Step S10, the control unit 101 adjusts the temperature of the shaping stage 10 to the predetermined reference temperature by the temperature control portion 253. By doing this, a relief structure illustrated in FIG. 9, in which the second shaping face portion 11b projects from the first shaping face portion 11a is formed in the shaping face 11, and the fixing property of the shaping material to the shaping face 11 during shaping of the shaped article can be enhanced. After completion of the shaping processing in Step S20, the control unit 101 increases the temperature of the shaping stage 10 to a predetermined high temperature not lower than the reference temperature by the temperature control portion 253 in Step S30. By doing this, the shaped article OB is in a state of being easily separated from the shaping stage 10 such that the relief structure of the shaping face 11 is changed to a state where the second shaping face portion 11b is recessed from the first shaping face portion 11a as shown in FIG. 6B and the second member 13 is separated from the bottom face of the shaped article OB. In another embodiment, the control unit 101 of the shaping apparatus 100a of the third embodiment may increase the temperature of the shaping stage 10 to a high temperature not lower than the reference temperature in Step S10 and decrease the temperature of the shaping stage 10 in Step S30 as described in the second embodiment.

According to the shaping apparatus 100a of the third embodiment, the temperature of the shaping stage 10 can be changed through the base stand 210 being in contact with the shaping stage 10 by the temperature control portion 253, and therefore, the temperature control of the shaping stage 10 can be efficiently and more accurately performed. In addition thereto, according to the shaping stage 10, the shaping apparatus 100a, and the control method of the shaping apparatus 100a of the third embodiment, various operational effects similar to those described in the above-mentioned respective embodiments can be brought about.

4. Fourth Embodiment

Figure 10A:
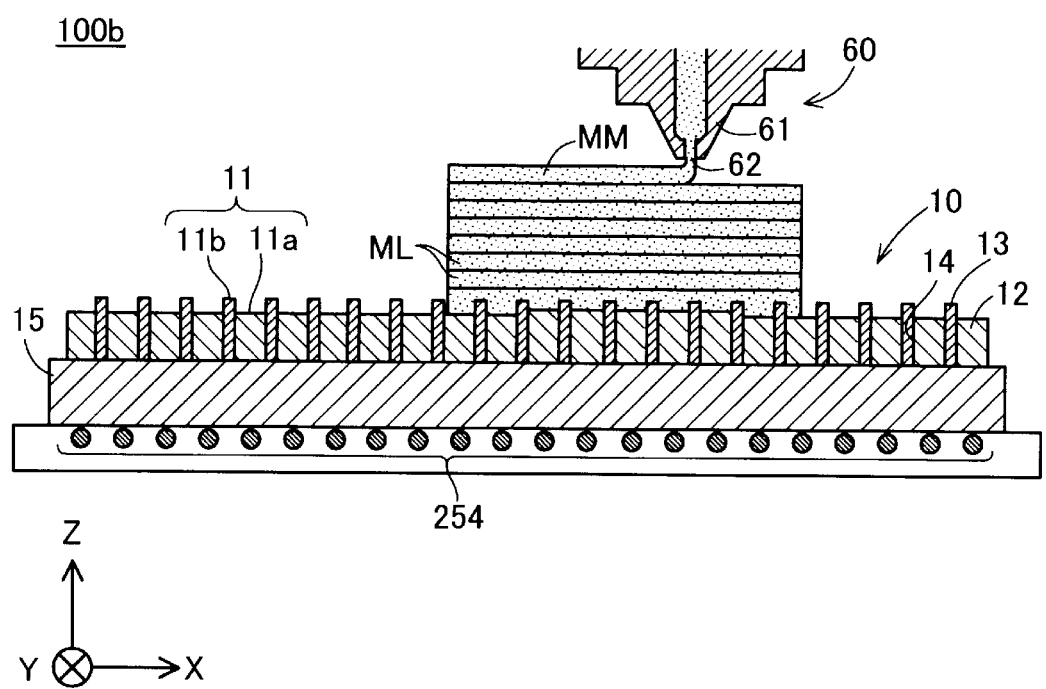
FIG. 10A is a first schematic view showing a configuration of a three-dimensional shaping apparatus of a fourth embodiment.
Figure 10B:
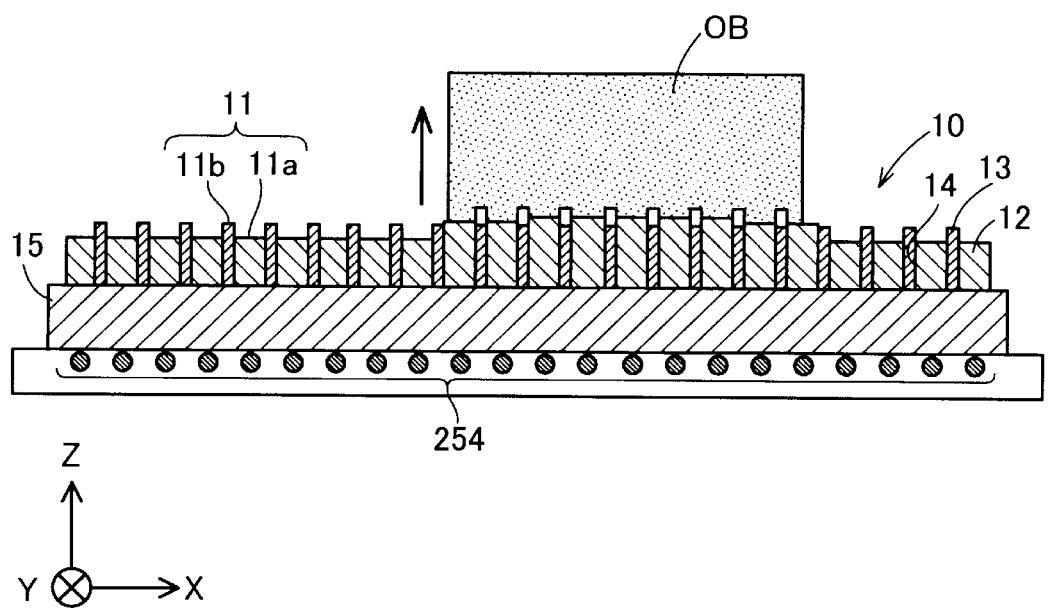
FIG. 10B is a second schematic view showing a configuration of the three-dimensional shaping apparatus of the fourth embodiment.

FIGS. 10A and 10B are schematic views for illustrating a configuration of a shaping apparatus 100b and a shaping step of a fourth embodiment. FIG. 10A shows a state during shaping of the shaped article OB, and FIG. 10B shows a state after completion of shaping of the shaped article OB. In FIGS. 10A and 10B, only the base stand 210, the shaping stage 10 thereon, and the nozzle 61 of the ejecting portion 60 are illustrated for convenience, and illustration of the other constituent portions is omitted. The shaping apparatus 100b of the fourth embodiment is different from the shaping apparatus 100a of the third embodiment only in that in place of the temperature control portion 253 of the third embodiment, a temperature control portion 254 of the fourth embodiment is incorporated in the base stand 210. The control unit 101 of the shaping apparatus 100b of the fourth embodiment performs the shaping step according to the flow in FIG. 5.

The temperature control portion 254 of the fourth embodiment can independently adjust the temperature of each of a plurality of regions on the shaping face 11 when performing temperature control of the shaping stage 10 mounted on the base stand 210. The temperature control portion 254 is constituted by, for example, a plurality of heating elements arranged inside the base stand 210. The control unit 101 specifies a region where the shaped article OB is shaped in the shaping face 11 based on the shaping data when performing Step S10 or Step S30. Then, the temperature of the specified region is controlled by the temperature control portion 254. According to this, energy consumption for temperature control of the shaping stage 10 can be saved, which is economical as compared with the case where all the regions on the shaping face 11 are evenly controlled.

For example, in Step S10, the control unit 101 controls the temperature of the shaping stage 10 to the reference temperature so as to bring the shaping stage 10 into a state in FIG. 10A where the second shaping face portion 11b projects from the first shaping face portion 11a and enhance the fixing property of the shaping material MM to the shaping face 11. At that time, the control unit 101 controls the temperature for each region so that the second shaping face portion 11b projects more from the first shaping face portion 11a at a site closer to an outer circumferential region in the bottom face of the shaped article OB. By doing this, the shaped article OB is brought into a state of being fixed more rigidly at a site closer to the outer circumferential region of the bottom face of the shaped article OB during shaping, and occurrence of warpage due to shrinkage of the shaped article OB can be suppressed.

In Step S30, the control unit 101 increases the temperature of only the region where the shaped article OB is shaped to the predetermined temperature higher than the reference temperature, thereby locating the second shaping face portion 11b in the region at a position recessed from the first shaping face portion 11a. By doing this, the bottom face of the shaped article OB is raised by the first shaping face portion 11a and separated from the second shaping face portion 11b of the second member 13 so as to facilitate separation of the shaped article OB from the shaping stage 10.

In another embodiment, the control unit 101 may, for example, heat only a shaping region of the shaped article OB in Step S10 so as to bring the second shaping face portion 11b into a state of being recessed from the first shaping face portion 11a unlike the configuration illustrated in FIG. 10A. Then, in Step S30, the temperature of the shaping region of the shaped article OB in the shaping stage 10 may be decreased to the reference temperature so as to separate the first shaping face portion 11a from the bottom face of the shaped article OB.

According to the shaping stage 10, the shaping apparatus 100b, and the control method of the shaping apparatus 100b of the fourth embodiment, various operational effects similar to those described in the above-mentioned respective embodiments can be brought about.

5. Fifth Embodiment

Figure 11:
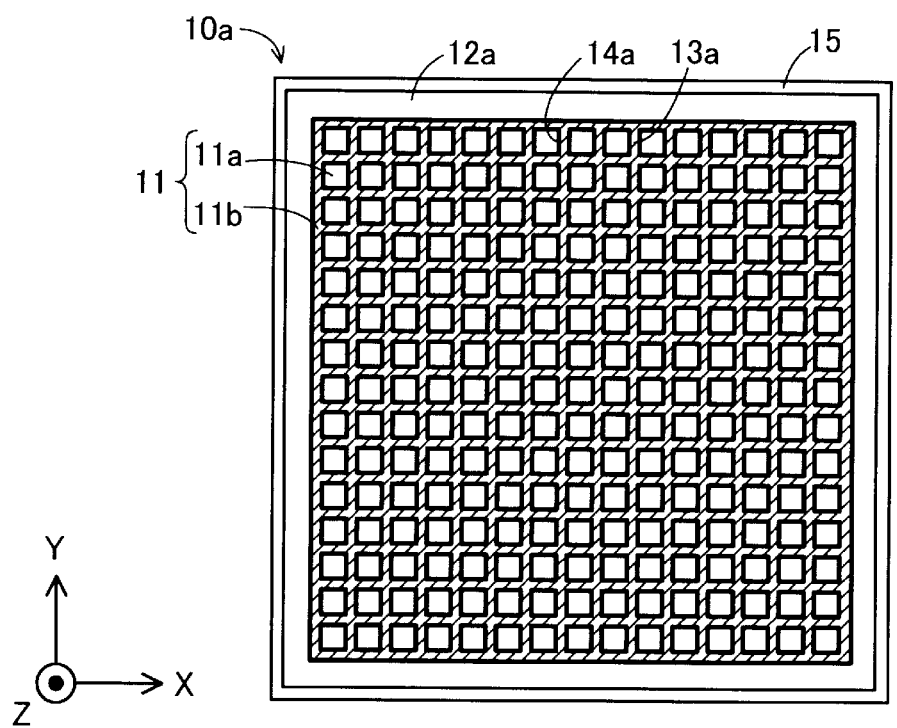
FIG. 11 is a schematic plan view showing a shaping stage of a fifth embodiment at a shaping face side.

FIG. 11 is a schematic plan view showing a shaping stage 10a of a fifth embodiment at a shaping face 11 side. In FIG. 11, the second shaping face portion 11b is hatched for convenience. The shaping stage 10a of the fifth embodiment has substantially the same configuration as the shaping stage 10 of the first embodiment except for the point described below.

The shaping stage 10a of the fifth embodiment includes a plurality of bottomless groove portions in which vertical grooves and horizontal grooves are arranged in a lattice shape in place of the penetration portions 14 constituted as a plurality of penetration holes scattered therein. That is, it includes a first member 12a provided with penetration portions 14a constituted by slits. Further, it includes a second member 13a that is constituted by linear members placed along the penetration portions 14a and that is arranged in a lattice shape in place of the second members 13 constituted by the columnar members. According to this, in the shaping stage 10a of the fifth embodiment, the second shaping face portions 11b are arranged in a lattice shape in the shaping face 11.

Even the shaping stage 10a of the fifth embodiment can change the relief structure in the shaping face 11 by temperature control in the same manner as the shaping stage 10 of the first embodiment. Therefore, by using the shaping stage 10a of the fifth embodiment in the shaping apparatuses 100, 100a, and 100b described in the above-mentioned respective embodiments, separation of the shaped article from the shaping face 11 after completion of shaping can be facilitated. Further, the fixing property of the shaping material MM to the shaping face 11 during shaping of the shaped article can be enhanced. In addition thereto, according to the shaping stage 10a of the fifth embodiment, and the shaping apparatus 100, 100a, or 100b using the same, and the control method of the shaping apparatus 100, 100a, or 100b, various operational effects similar to those described in the above-mentioned respective embodiments can be brought about.

6. Sixth Embodiment

Figure 12A:
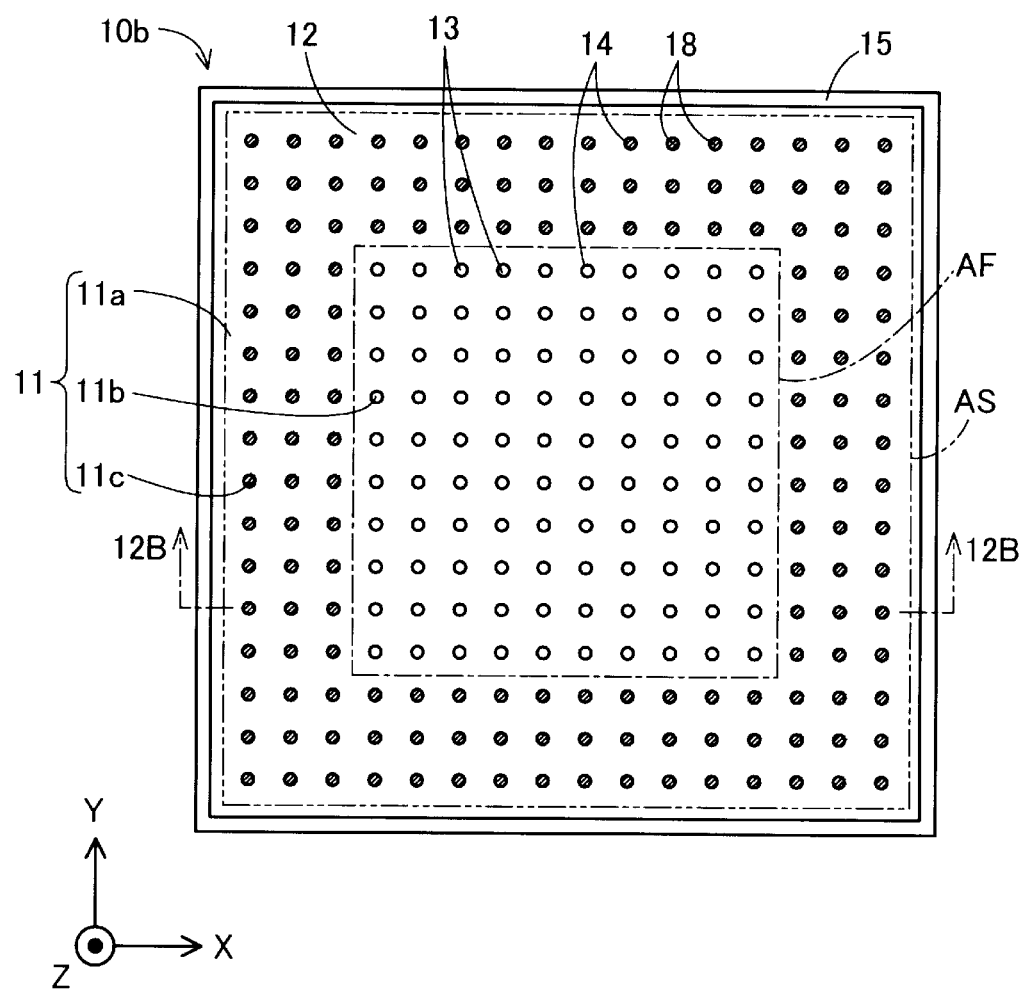
FIG. 12A is a schematic plan view showing a shaping stage of a sixth embodiment at a shaping face side.
Figure 12B:
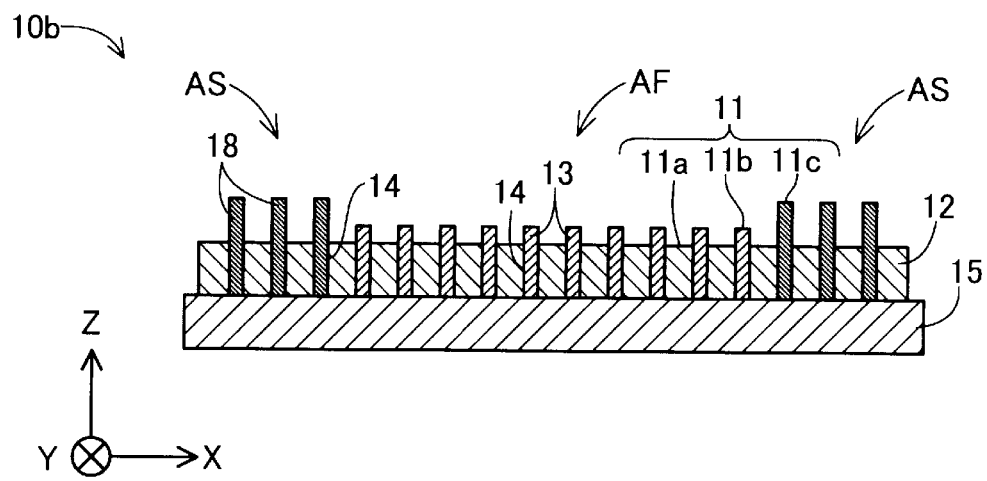
FIG. 12B is a schematic cross-sectional view showing one example of a state after temperature control of the shaping stage of the sixth embodiment.

FIG. 12A is a schematic plan view showing a shaping stage 10b of a sixth embodiment at a shaping face 11 side. FIG. 12B is a schematic cross-sectional view of the shaping stage 10b of the sixth embodiment taken along the line 12B-12B in FIG. 12A and illustrates a state when the shaping stage 10b of the sixth embodiment is subjected to temperature control. The shaping stage 10b of the sixth embodiment has substantially the same configuration as the shaping stage 10 of the first embodiment except for the point described below.

In the shaping stage 10b of the sixth embodiment, the thermal expansion coefficient of the first member 12 is smaller than the thermal expansion coefficient of the second member 13. In the sixth embodiment, a configuration in which the first member 12 is constituted by a metal plate and the second member 13 is constituted by a resin material may be adopted.

Further, in the shaping stage 10b of the sixth embodiment, some second members 13 are replaced by third members 18 having a thermal expansion coefficient different from the first member 12 and the second member 13. The third member 18 has the same shape as the second member 13 and is placed in the penetration portions 14 where the second member 13 is not placed among the penetration portions 14. A difference in the thermal expansion coefficient between the first member 12 and the third member 18 is larger than a difference in the thermal expansion coefficient between the first member 12 and the second member 13.

The third member 18 has a third shaping face portion 11c included in the shaping face 11 at a tip portion exposed from the penetration portion 14. In the shaping stage 10b of the sixth embodiment, the shaping face 11 is constituted by the first shaping face portion 11a of the first member 12, the second shaping face portions 11b of the second members 13, and the third shaping face portions 11c of the third members 18.

The shaping face 11 includes a first region AF having the first shaping face portion 11a of the first member 12 and the second shaping face portions 11b of the second members 13, and a second region AS having the first shaping face portion 11a of the first member 12 and the third shaping face portions 11c of the third members 18. The first region AF is located at a central portion side of the shaping face 11, and the second region AS surrounds the outer periphery of the first region AF. In another embodiment, in the first region AF and the second region AS, the penetration portions 14a constituted by groove portions in a lattice shape described in the sixth embodiment are provided, and linear second members 13 or third members 18 may be arranged in a lattice shape in the penetration portions 14a.

According to the shaping stage 10b of the sixth embodiment, when the temperature of the shaping stage 10b is changed, as illustrated in FIG. 12B, the amount of change in the level difference of the relief structure in the second region AS can be made larger than in the first region AF. Therefore, for example, if a portion at a central side in the bottom face of the shaped article is shaped in the first region AF where the level difference of the relief structure is small, and a portion at an outer peripheral side is shaped in the second region AS where the level difference of the relief structure is large, shaping can be performed in a state where the portion at an outer peripheral side is more rigidly fixed than the portion at a central portion side. According to this method, occurrence of warpage of the bottom face of the shaped article can be suppressed, and the shaping accuracy of the shaped article can be enhanced.

By using the shaping stage 10b of the sixth embodiment in the shaping apparatuses 100, 100a, and 100b described in the above-mentioned respective embodiments, separation of the shaped article from the shaping face 11 after completion of shaping can be facilitated. Further, the fixing property of the shaping material MM to the shaping face 11 during shaping of the shaped article can be enhanced. In addition thereto, according to the shaping stage 10b of the sixth embodiment, and the shaping apparatus 100, 100a, or 100b using the same, and the control method of the shaping apparatus 100, 100a, or 100b, various operational effects similar to those described in the above-mentioned respective embodiments can be brought about.

7. Seventh Embodiment

Figure 13:
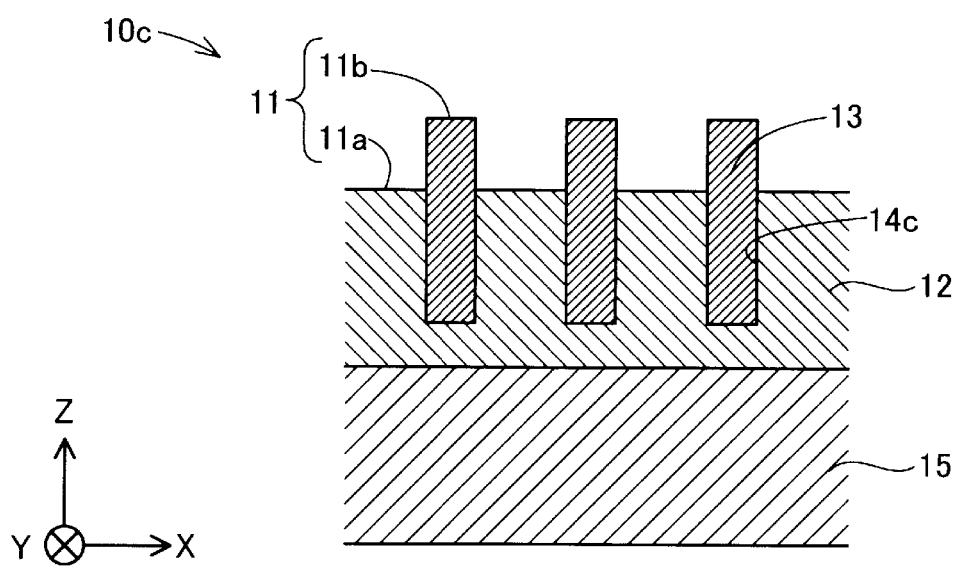
FIG. 13 is a schematic cross-sectional view showing a shaping stage of a seventh embodiment.

FIG. 13 is a schematic cross-sectional view of the shaping stage 10c of a seventh embodiment. The configuration of the shaping stage 10c of the seventh embodiment is substantially the same as that of the shaping stage 10 of the first embodiment except that recess portions 14c are provided in the first member 12 in place of the penetration portions 14. The recess portion 14c is constituted by a bottomed hole portion, and a peripheral portion of the recess portion 14c is constituted by the first shaping face portion 11a. The second member 13 is placed in an internal space of the recess portion 14c. The shaping stage 10c of the seventh embodiment can be used in the shaping apparatuses 100, 100a, and 100b or in the shaping step described in the above-mentioned respective embodiments. Even the shaping stage 10c of the seventh embodiment can bring about various operational effects similar to those described in the above-mentioned respective embodiments. In another embodiment, the recess portion 14c may be constituted by a bottomed groove portion instead of being constituted as a hole portion. The bottomed groove portions may be arranged in a lattice shape or may have another arrangement configuration.

8. Other Embodiments

Various configurations described in the above-mentioned respective embodiments may be changed, for example, as follows. Other embodiments described below are all regarded as examples of embodiments for implementing the technique of the present disclosure in the same manner as the configurations described in the above-mentioned respective embodiments or as another embodiment in the above-mentioned respective embodiments.

(1) Other Embodiment 1

In the respective embodiments other than the sixth embodiment described above, the first member 12 or 12a may be constituted by a material having a thermal expansion coefficient smaller than the second member 13 or 13a. In that case, for example, the first member 12 or 12a may be constituted by a metal material, and the second member 13 or 13a may be constituted by a resin material. Even in the shaping stage having such a configuration, the relief structure in the shaping face 11 can be changed by changing the temperature thereof. In the above-mentioned sixth embodiment, the first member 12 or 12a may be constituted by a material having a thermal expansion coefficient larger than the second member 13 or 13a. In the above-mentioned respective embodiments, both of the first member 12 or 12a and the second member 13 or 13a may be constituted by a resin material having a different thermal expansion coefficient, or both of the first member 12 or 12a and the second member 13 or 13a may be formed by a metal material having a different thermal expansion coefficient. The first member 12 or 12a and the second member 13 or 13a may be constituted by a material other than a resin material or a metal material. For example, one of the first member 12 or 12a and the second member 13 or 13a may be constituted by a ceramic.

(2) Other Embodiment 2

In the above-mentioned respective embodiments, the shaping stage 10, 10a, 10b, or 10c may have a plurality of penetration portions 14 or recess portions 14c having different opening shapes. In the above-mentioned respective embodiments, when a plurality of groove-like penetration portions 14 or recess portions 14c are provided in the first member 12, the groove-like penetration portions 14 or recess portions 14c may not be arranged in a lattice shape. The groove-like penetration portions 14 or groove-like recess portions 14c may be arranged in parallel without crossing each other. Further, they may be arranged so as to radially extend from the center of the shaping face 11.

(3) Other Embodiment 3

In the shaping step of the above-mentioned respective embodiments, the recesses and the projections of the relief structure formed in the shaping face 11 are inverted between during shaping of the shaped article and after completion of shaping by changing the temperature of the shaping stage 10, 10a, 10b, or 10c from a low temperature to a high temperature or from a high temperature to a low temperature. On the other hand, it is not necessary to invert the recesses and the projections of the relief structure formed in the shaping face 11, and it is sufficient only to decrease the relative height of the projection portion of the relief structure. For example, in the above-mentioned first embodiment, it is sufficient only to decrease the height of the second member 13 projecting from the recess portion 14c before separating the shaped article OB.

(4) Other Embodiment 4

The shaping apparatuses 100, 100a, and 100b of the above-mentioned respective embodiments may include both of the temperature control portion 250 controlling the temperature in the chamber 240 and the temperature control portion 253 or 254 provided in the base stand 210, and the control unit 101 may perform temperature control of the shaping stage 10, 10a, 10b, or 10c using both.

(5) Other Embodiment 5

Figure 14:
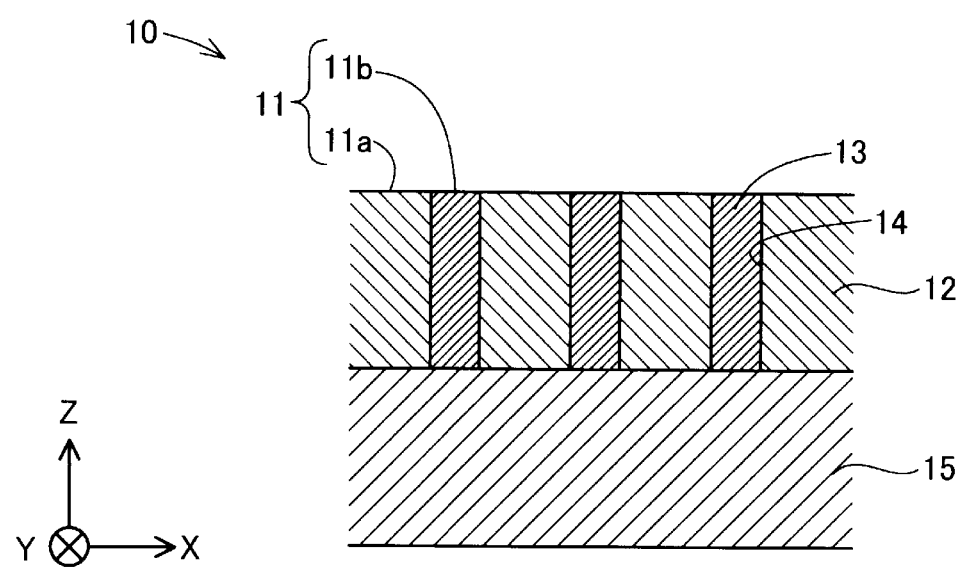
FIG. 14 is a schematic view showing a state of a shaping stage in a shaping step of another embodiment.

FIG. 14 is a schematic cross-sectional view of the shaping stage 10 for illustrating temperature control of the shaping stage 10 in other embodiment 5. In the shaping step of the above-mentioned respective embodiments, by the temperature control in Step S30, the shaping face 11 of the shaping stage 10, 10a, 10b, or 10c may be brought into a flat state in which the relief structure is eliminated as shown in FIG. 14 from the state in FIG. 6A. Even by doing this, the contact area between the bottom face of the shaped article OB and the shaping face 11 can be reduced, and therefore, in Step S40, the shaped article is easily separated from the shaping stage 10, 10a, 10b, or 10c. Alternatively, the shaping face 11 is brought into a flat state in which the relief structure is eliminated shown in FIG. 14 by temperature control in Step S10, and a shaped article is shaped by shaping processing in Step S20, and then, in Step S30, temperature control may be performed so as to form a relief structure in the shaping face 11. Even by such a control method, at least separation of the shaped article from the shaping stage 10, 10*a*, 10*b*, or 10*c* is facilitated.

(6) Other Embodiment 6

The forming portion 30 may have, for example, a configuration in which the shaping material is pushed out from the nozzle 61 by rotating an in-line screw with a longer length in the Z direction than the diameter in place of the configuration utilizing the flat screw 40. Further, the shaping apparatus 100 may not adopt a configuration using the flat screw 40 or the above-mentioned in-line screw, but adopt a normal FDM system (fused deposition modeling system). In the shaping apparatus 100, a configuration in which a filament composed of a thermoplastic resin is spun out of a bobbin having the filament wound therearound to a nozzle, and the filament is melted by a heater provided in the nozzle, and the melted material is discharged from the nozzle as the shaping material may be adopted.

(7) Other Embodiment 7

In the above-mentioned respective embodiments, the material supply portion 20 may have a configuration including a plurality of hoppers. In that case, the shaping material may be formed by supplying different materials to the flat screw 40 from the respective hoppers and mixing the materials in the scroll groove 42 of the flat screw 40. For example, a powder material to serve as the main material described in the above-mentioned embodiments, and a solvent, a binder, etc. to be added thereto may be supplied to the flat screw 40 in parallel from different hoppers.

9. Other Aspects

The technique of the present disclosure is not limited to the above-mentioned respective embodiments or Examples, but can be realized by various aspects without departing from the gist thereof. For example, the technique of the present disclosure can be realized as the following aspects. The technical features in the above-mentioned respective embodiments corresponding to technical features in the respective aspects described below may be appropriately replaced or combined in order to solve part or all of the problems of the technique of the present disclosure or achieve part or all of the effects brought about by the technique of the present disclosure. Further, the technical features may be appropriately deleted unless they are described as essential features in the specification.

(1) A first aspect is provided as a shaping stage that has a shaping face where a shaping material is deposited and that is used for three-dimensional shaping by being subjected to temperature control, and the shaping stage includes a first member having a plurality of recess portions or penetration portions and a first shaping face portion that is present in peripheries of the recess portions or the penetration portions and that is included in the shaping face, and a second member that is placed in internal spaces of the recess portions or the penetration portions, that has a second shaping face portion included in the shaping face, and that has a thermal expansion coefficient different from the first member.

According to the shaping stage of this aspect, the first member and the second member have different thermal expansion coefficients, and therefore, by changing the temperature of the shaping stage, the level difference of the relief structure in the shaping face can be changed, or the recesses and the projections of the relief structure can be inverted. Therefore, for example, by adjusting the temperature of the shaping stage after completion of shaping of the three-dimensional shaped article so as to change the level difference of the relief structure or invert the recesses and the projections of the relief structure, separation of the three-dimensional shaped article from the shaping face can be facilitated.

(2) In the shaping stage of the above aspect, the second shaping face portions may be arranged in a lattice shape in the shaping face.

According to the shaping stage of this aspect, a lattice-shaped relief structure can be formed in the shaping face.

(3) In the shaping stage of the above aspect, when the shaping material is deposited in the shaping face, the shaping face may have a relief structure since the second shaping face portions are at positions recessed from the first shaping face portion or at positions projecting from the first shaping face portion.

According to the shaping stage of this aspect, due to an anchor effect of the relief structure formed in the shaping face during shaping of the shaped article, the fixing property of the shaping material to the shaping face can be enhanced, and the shaping accuracy of the shaped article can be enhanced.

(4) In the shaping stage of the above aspect, the first member may be constituted by a resin material, and the second member may be constituted by a metal material.

According to the shaping stage of this aspect, the shaping stage in which the relief structure of the shaping face can be changed by temperature control can be simply formed by a combination of a resin material with a metal material.

(5) The shaping stage of the above aspect may further include a third member that has a thermal expansion coefficient different from the first member and the second member, that is placed in the recess portions or the penetration portions where the second member is not placed among the plurality of recess portions or penetration portions, and that has a third shaping face portion included in the shaping face, wherein a difference between the thermal expansion coefficient of the first member and the thermal expansion coefficient of the third member may be larger than a difference between the thermal expansion coefficient of the first member and the thermal expansion coefficient of the second member, and the shaping face may include a first region having the first shaping face portion and the second shaping face portions, and a second region that surrounds the first region and that has the first shaping face portion and the third shaping face portions.

According to the shaping stage of this aspect, the amount of change in the relief structure in the second region can be made larger than in the first region when changing the temperature of the shaping stage. If, for example, a portion at a central side in the bottom face of the three-dimensional shaped article is shaped in the first region and a portion at an outer peripheral side is shaped in the second region by using the shaping stage of this aspect, shaping can be performed in a state where the portion at an outer peripheral side is more rigidly fixed than the portion at a central side. According to this, occurrence of warpage of the bottom face of the three-dimensional shaped article can be suppressed.

(6) A second aspect is provided as a three-dimensional shaping apparatus including an ejecting portion ejecting a shaping material, a shaping stage where a three-dimensional shaped article is shaped by depositing the shaping material, and a temperature control portion controlling a temperature of the shaping stage, wherein the shaping stage includes a first member having a plurality of recess portions or penetration portions and a first shaping face portion that is present in peripheries of the recess portions or the penetration portions and that is included in the shaping face and a second member that is placed in internal spaces of the recess portions or the penetration portions, that has a second shaping face portion included in the shaping face, and that has a thermal expansion coefficient different from the first member, and the temperature control portion controls the temperature of the shaping stage so as to control the shaping stage at a first temperature during shaping of the three-dimensional shaped article and control the shaping stage at a second temperature after completion of shaping of the three-dimensional shaped article so that a temperature difference between the first temperature and the second temperature becomes a temperature difference not less than a predetermined temperature.

According to the three-dimensional shaping apparatus of this aspect, by performing temperature control of the shaping stage so as to change the relief structure of the shaping face after completion of shaping the three-dimensional shaped article, separation of the three-dimensional shaped article from the shaping face can be facilitated.

(7) The three-dimensional shaping apparatus of the above aspect may further include a chamber housing the ejecting portion and the shaping stage, wherein the temperature control portion may control the temperature of the shaping stage by changing room temperature in the chamber.

According to the three-dimensional shaping apparatus of this aspect, by performing temperature control in the chamber, the relief structure in the shaping face of the shaping stage can be simply changed.

(8) The three-dimensional shaping apparatus of the above aspect may further include a base stand where the shaping stage is placed, wherein the temperature control portion may be provided in the base stand and control the temperature of the shaping stage on the base stand.

According to the three-dimensional shaping apparatus of this aspect, the temperature of the shaping stage can be changed through the base stand being in contact with the shaping stage, and therefore, the temperature control of the shaping stage can be efficiently and accurately performed.

(9) In the three-dimensional shaping apparatus of the above aspect, the temperature control portion may control the temperature of each of a plurality of regions on the shaping face.

According to the three-dimensional shaping apparatus of this aspect, the fixing property of the shaping material or ease of separation can be changed for each of the plurality of regions on the shaping face of the shaping stage.

(10) A third aspect is provided as a control method of a three-dimensional shaping apparatus, including shaping a three-dimensional shaped article by ejecting a shaping material from an ejecting portion and depositing the shaping material in a shaping stage having a shaping face where the shaping material is deposited, the shaping stage including a first member having a plurality of recess portions or penetration portions and a first shaping face portion that is present in peripheries of the recess portions or the penetration portions and that is included in the shaping face, and a second member that is placed in internal spaces of the recess portions or the penetration portions, that has a second shaping face portion included in the shaping face, and that has a thermal expansion coefficient different from the first member, and controlling the temperature of the shaping stage with a temperature difference not less than a predetermined temperature between during shaping of the three-dimensional shaped article and after completion of shaping of the three-dimensional shaped article by a temperature control portion controlling the temperature of the shaping stage.

According to the control method of a three-dimensional shaping apparatus of this aspect, by performing temperature control of the shaping stage so as to change the relief structure of the shaping face after completion of shaping the three-dimensional shaped article, separation of the three-dimensional shaped article from the shaping face can be facilitated.

The technique of the present disclosure can also be realized in various forms other than the shaping stage, the three-dimensional shaping apparatus, and the control method of a three-dimensional shaping apparatus. For example, it can be realized in the forms of a method of shaping or producing a three-dimensional shaped article, a method of producing a shaping stage, a control method of a shaping stage, a program for realizing a control method of a shaping stage or a three-dimensional shaping apparatus, a recording medium recording the program, etc.

What is claimed is:

1. A shaping stage that has a shaping face where a shaping material is deposited and that is used for three-dimensional shaping by being subjected to temperature control, the stage comprising:
    a first member having a plurality of recess portions or penetration portions and a first shaping face portion that is present in peripheries of the recess portions or the penetration portions and that is included in the shaping face; and
    a second member that is placed in the recess portions or the penetration portions, that has a second shaping face portion included in the shaping face, and that has a thermal expansion coefficient different from the first member; and
    a third member that has a thermal expansion coefficient different from the first member and the second member, that is placed in the recess portions or the penetration portions where the second member is not laced among the plurality of recess portions or penetration portions, and that has a third shaping face portion included in the shaping face, wherein
    when the shaping material is deposited above the shaping face, the shaping face has a relief structure configured by the second shaping face portions being at positions recessed from the first shaping face portion or at positions projecting from the first shaping face portion,
    the shaping stage is configured such that the relief structure in the shaping face is deformed according to a temperature of the shaping stage,
    a difference between the thermal expansion coefficient of the first member and the thermal expansion coefficient of the third member is larger than a difference between the thermal expansion coefficient of the first member and the thermal expansion coefficient of the second member, and
    the shaping face includes
        a first region having the first shaping face portion and the second shaping face portions, and
        a second region that surrounds the first region and that has the first shaping face portion and the third shaping face portions.

2. The shaping stage according to claim 1, wherein the second shaping face portions are arranged in a lattice shape in the shaping face.

3. The shaping stage according to claim 1, wherein
the first member is constituted by a resin material, and the second member is constituted by a metal material.

4. A three-dimensional shaping apparatus, comprising:
an ejecting portion ejecting a shaping material;
a shaping stage having a shaping face where a three-dimensional shaped article is shaped by depositing the shaping material; and
a temperature control portion controlling a temperature of the shaping stage, wherein
the shaping stage includes
  a first member having a plurality of recess portions or penetration portions and a first shaping face portion that is present in peripheries of the recess portions or the penetration portions and that is included in the shaping face;
  a second member that is placed in the recess portions or the penetration portions, that has a second shaping face portion included in the shaping face, and that has a thermal expansion coefficient different from the first member; and
  a third member that has a thermal expansion coefficient different from the first member and the second member, that is placed in the recess portions or the penetration portions where the second member is not placed among the plurality of recess portions or penetration portions, and that has a third shaping face portion included in the shaping face,
the temperature control portion controls the shaping stage at a first temperature during shaping of the three-dimensional shaped article and controls the shaping stage at a second temperature different from the first temperature after completion of shaping of the three-dimensional shaped article,
when the shaping material is deposited above the shaping face, the shaping face has a relief structure configured by the second shaping face portions being at positions recessed from the first shaping face portion or at positions projecting from the first shaping face portion,
the shaping stage is configured such that the relief structure in the shaping face is deformed according to a temperature of the shaping stage,
a difference between the thermal expansion coefficient of the first member and the thermal expansion coefficient of the third member is larger than a difference between the thermal expansion coefficient of the first member and the thermal expansion coefficient of the second member, and
the shaping face includes
  a first region having the first shaping face portion and the second shaping face portions, and
  a second region that surrounds the first region and that has the first shaping face portion and the third shaping face portions.

5. The three-dimensional shaping apparatus according to claim 4, further comprising:
a chamber housing the ejecting portion and the shaping stage, wherein
the temperature control portion controls the temperature of the shaping stage by changing room temperature in the chamber.

6. The three-dimensional shaping apparatus according to claim 4, further comprising:
a base stand where the shaping stage is placed, wherein
the temperature control portion is provided in the base stand and controls the temperature of the shaping stage on the base stand.

7. The three-dimensional shaping apparatus according to claim 6, wherein
the temperature control portion controls the temperature of each of a plurality of regions on the shaping face.

\* \* \* \* \*